(12) United States Patent
Casado et al.

(10) Patent No.: US 9,083,609 B2
(45) Date of Patent: Jul. 14, 2015

(54) NETWORK OPERATING SYSTEM FOR MANAGING AND SECURING NETWORKS

(75) Inventors: Martin Casado, Menlo Park, CA (US); Keith Eric Amidon, Los Altos, CA (US); Peter J. Balland, III, Palo Alto, CA (US); Natasha Gude, Palo Alto, CA (US); Justin Pettit, San Jose, CA (US); Benjamin Levy Pfaff, Redwood City, CA (US); Scott J. Shenker, Palo Alto, CA (US); Daniel J. Wendlandt, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 636 days.

(21) Appl. No.: 12/286,098

(22) Filed: Sep. 26, 2008

(65) Prior Publication Data
US 2009/0138577 A1 May 28, 2009

Related U.S. Application Data

(60) Provisional application No. 60/995,435, filed on Sep. 26, 2007, provisional application No. 61/010,985, filed on Jan. 14, 2008.

(51) Int. Cl.
*H04L 12/24* (2006.01)
*H04L 12/26* (2006.01)

(52) U.S. Cl.
CPC .............. *H04L 41/06* (2013.01); *H04L 41/082* (2013.01); *H04L 41/0809* (2013.01); *H04L 41/0853* (2013.01); *H04L 41/0859* (2013.01);
(Continued)

(58) Field of Classification Search
None
See application file for complete search history.

(56) References Cited

U.S. PATENT DOCUMENTS 5,049,873 A 9/1991 Robins et al.
5,265,092 A 11/1993 Soloway et al.
(Continued)

FOREIGN PATENT DOCUMENTS

AU 2010232526 10/2011
AU 2008304243 12/2013
(Continued)

OTHER PUBLICATIONS

HP OpenView Operations 8.0 for UNIX Developer's Toolkit, Jun. 2004, pp. 1-4.*
(Continued)

*Primary Examiner* — Ario Etienne
*Assistant Examiner* — Clayton R Williams
(74) *Attorney, Agent, or Firm* — Adeli LLP

(57) ABSTRACT

Systems and methods for managing a network are described. A view of current state of the network is maintained where the current state of the network characterizes network topology and network constituents, including network entities and network elements residing in or on the network. Events are announced that correspond to changes in the state of the network and one or more network elements can be configured accordingly. Methods for managing network traffic are described that ensure forwarding and other actions taken by network elements implement globally declared network policy and refer to high-level names, independently of network topology and the location of network constituents. Methods for discovering network constituents are described, whereby are automatically configured. Routing may be performed using ACL and packets can be intercepted to permit host to continue in sleep mode. The methods are applicable to virtual environments.

24 Claims, 5 Drawing Sheets

(52) U.S. Cl.
CPC ............ *H04L41/12* (2013.01); *H04L 43/0817* (2013.01); *H04L 41/0213* (2013.01); *H04L 41/0893* (2013.01)

(56) References Cited

U.S. PATENT DOCUMENTS

| | | | |
|---|---|---|---|
| 5,504,921 A | 4/1996 | Dev et al. | |
| 5,550,816 A | 8/1996 | Hardwick et al. | |
| 5,729,685 A | 3/1998 | Chatwani et al. | |
| 5,751,967 A | 5/1998 | Raab et al. | |
| 5,796,936 A | 8/1998 | Watabe et al. | |
| 5,832,222 A | 11/1998 | Dziadosz et al. | |
| 5,926,463 A | 7/1999 | Ahearn et al. | |
| 6,006,275 A | 12/1999 | Picazo, Jr. et al. | |
| 6,055,243 A | 4/2000 | Vincent et al. | |
| 6,104,699 A | 8/2000 | Holender et al. | |
| 6,104,700 A | 8/2000 | Haddock et al. | |
| 6,219,699 B1 | 4/2001 | McCloghrie et al. | |
| 6,324,275 B1 | 11/2001 | Yagel et al. | |
| 6,366,657 B1 | 4/2002 | Yagel et al. | |
| 6,512,745 B1 | 1/2003 | Abe et al. | |
| 6,539,432 B1 | 3/2003 | Taguchi et al. | |
| 6,680,934 B1 | 1/2004 | Cain | |
| 6,697,338 B1 | 2/2004 | Breitbart et al. | |
| 6,735,602 B2 | 5/2004 | Childress et al. | |
| 6,785,843 B1 | 8/2004 | McRae et al. | |
| 6,894,983 B1 | 5/2005 | Lederman et al. | |
| 6,912,221 B1 | 6/2005 | Zadikian et al. | |
| 6,963,585 B1 | 11/2005 | Le Pennec et al. | |
| 6,985,937 B1 | 1/2006 | Keshav et al. | |
| 7,042,912 B2 | 5/2006 | Ashwood Smith et al. | |
| 7,046,630 B2 | 5/2006 | Abe et al. | |
| 7,080,378 B1 | 7/2006 | Noland et al. | |
| 7,126,923 B1 | 10/2006 | Yang et al. | |
| 7,158,972 B2 | 1/2007 | Marsland | |
| 7,197,561 B1 | 3/2007 | Lovy et al. | |
| 7,209,439 B2 | 4/2007 | Rawlins et al. | |
| 7,263,290 B2 | 8/2007 | Fortin et al. | |
| 7,283,473 B2 | 10/2007 | Arndt et al. | |
| 7,286,490 B2 | 10/2007 | Saleh et al. | |
| 7,342,916 B2 | 3/2008 | Das et al. | |
| 7,343,410 B2 | 3/2008 | Mercier et al. | |
| 7,359,971 B2 | 4/2008 | Jorgensen | |
| 7,450,598 B2 | 11/2008 | Chen et al. | |
| 7,478,173 B1 | 1/2009 | Delco | |
| 7,555,002 B2 | 6/2009 | Arndt et al. | |
| 7,587,492 B2 * | 9/2009 | Dyck et al. ..................... | 709/226 |
| 7,590,669 B2 | 9/2009 | Yip et al. | |
| 7,606,260 B2 | 10/2009 | Oguchi et al. | |
| 7,649,851 B2 | 1/2010 | Takashige et al. | |
| 7,710,874 B2 | 5/2010 | Balakrishnan et al. | |
| 7,764,599 B2 | 7/2010 | Doi et al. | |
| 7,783,856 B2 | 8/2010 | Hashimoto et al. | |
| 7,802,251 B2 | 9/2010 | Kitamura | |
| 7,808,929 B2 | 10/2010 | Wong et al. | |
| 7,818,452 B2 | 10/2010 | Matthews et al. | |
| 7,826,482 B1 | 11/2010 | Minei et al. | |
| 7,839,847 B2 | 11/2010 | Nadeau et al. | |
| 7,856,549 B2 | 12/2010 | Wheeler | |
| 7,885,276 B1 | 2/2011 | Lin | |
| 7,912,955 B1 | 3/2011 | Machiraju et al. | |
| 7,925,661 B2 | 4/2011 | Broussard et al. | |
| 7,936,770 B1 | 5/2011 | Frattura et al. | |
| 7,945,658 B1 * | 5/2011 | Nucci et al. ..................... | 709/224 |
| 7,948,986 B1 | 5/2011 | Ghosh et al. | |
| 7,970,917 B2 | 6/2011 | Nakano et al. | |
| 7,995,483 B1 | 8/2011 | Bayar et al. | |
| 8,031,633 B2 | 10/2011 | Bueno et al. | |
| 8,032,899 B2 | 10/2011 | Archer et al. | |
| 8,060,875 B1 * | 11/2011 | Lambeth ........................... | 718/1 |
| 8,089,871 B2 * | 1/2012 | Iloglu et al. ..................... | 370/230 |
| 8,130,648 B2 | 3/2012 | Kwan et al. | |
| 8,144,630 B1 | 3/2012 | Orr | |
| 8,155,028 B2 | 4/2012 | Abu-Hamdeh et al. | |
| 8,161,152 B2 * | 4/2012 | Ogielski et al. ..................... | 709/224 |
| 8,199,750 B1 | 6/2012 | Schultz et al. | |
| 8,223,668 B2 | 7/2012 | Allan et al. | |
| 8,265,075 B2 | 9/2012 | Pandey | |
| 8,339,959 B1 | 12/2012 | Moisand et al. | |
| 8,413,216 B2 | 4/2013 | Hughes et al. | |
| 2001/0043614 A1 | 11/2001 | Viswanadham et al. | |
| 2002/0034189 A1 | 3/2002 | Haddock et al. | |
| 2002/0093952 A1 | 7/2002 | Gonda | |
| 2002/0161867 A1 | 10/2002 | Cochran | |
| 2002/0194369 A1 | 12/2002 | Rawlins et al. | |
| 2003/0009552 A1 * | 1/2003 | Benfield et al. .................. | 709/224 |
| 2003/0058850 A1 | 3/2003 | Rangarajan et al. | |
| 2003/0069972 A1 | 4/2003 | Yoshimura et al. | |
| 2003/0204768 A1 | 10/2003 | Fee | |
| 2004/0054793 A1 | 3/2004 | Coleman | |
| 2004/0073659 A1 | 4/2004 | Rajsic et al. | |
| 2004/0098505 A1 | 5/2004 | Clemmensen | |
| 2004/0128310 A1 | 7/2004 | Zmudzinski et al. | |
| 2004/0151147 A1 | 8/2004 | Huckins | |
| 2004/0210889 A1 | 10/2004 | Childress et al. | |
| 2004/0250133 A1 | 12/2004 | Lim | |
| 2004/0267866 A1 * | 12/2004 | Carollo et al. .................. | 709/200 |
| 2004/0267897 A1 | 12/2004 | Hill et al. | |
| 2005/0018669 A1 | 1/2005 | Arndt et al. | |
| 2005/0021683 A1 * | 1/2005 | Newton et al. .................. | 709/220 |
| 2005/0027881 A1 | 2/2005 | Figueira et al. | |
| 2005/0050377 A1 * | 3/2005 | Chan et al. ........................ | 714/4 |
| 2005/0083953 A1 | 4/2005 | May | |
| 2005/0120160 A1 | 6/2005 | Plouffe et al. | |
| 2005/0132044 A1 | 6/2005 | Guingo et al. | |
| 2005/0201398 A1 | 9/2005 | Naik et al. | |
| 2005/0232230 A1 * | 10/2005 | Nagami et al. .................. | 370/351 |
| 2006/0026225 A1 | 2/2006 | Canali et al. | |
| 2006/0028999 A1 * | 2/2006 | Iakobashvili et al. ........ | 370/252 |
| 2006/0037075 A1 * | 2/2006 | Frattura et al. .................. | 726/22 |
| 2006/0092976 A1 | 5/2006 | Lakshman et al. | |
| 2006/0174087 A1 | 8/2006 | Hashimoto et al. | |
| 2006/0178898 A1 * | 8/2006 | Habibi ............................... | 705/1 |
| 2006/0184653 A1 | 8/2006 | van Riel | |
| 2006/0184937 A1 * | 8/2006 | Abels et al. ...................... | 718/1 |
| 2006/0187908 A1 | 8/2006 | Shimozono et al. | |
| 2006/0193266 A1 | 8/2006 | Siddha et al. | |
| 2006/0221961 A1 | 10/2006 | Basso et al. | |
| 2006/0248179 A1 * | 11/2006 | Short et al. ..................... | 709/223 |
| 2006/0282895 A1 | 12/2006 | Rentzis et al. | |
| 2007/0043860 A1 | 2/2007 | Pabari | |
| 2007/0055789 A1 * | 3/2007 | Claise et al. .................... | 709/234 |
| 2007/0156919 A1 | 7/2007 | Potti et al. | |
| 2007/0180490 A1 * | 8/2007 | Renzi et al. ....................... | 726/1 |
| 2007/0220358 A1 | 9/2007 | Goodill et al. | |
| 2007/0239987 A1 | 10/2007 | Hoole et al. | |
| 2007/0240160 A1 | 10/2007 | Paterson-Jones et al. | |
| 2007/0245082 A1 | 10/2007 | Margolus et al. | |
| 2007/0250608 A1 | 10/2007 | Watt | |
| 2007/0260721 A1 | 11/2007 | Bose et al. | |
| 2007/0266433 A1 | 11/2007 | Moore | |
| 2007/0286185 A1 | 12/2007 | Eriksson et al. | |
| 2007/0297428 A1 | 12/2007 | Bose et al. | |
| 2008/0002579 A1 | 1/2008 | Lindholm et al. | |
| 2008/0002683 A1 | 1/2008 | Droux et al. | |
| 2008/0034249 A1 | 2/2008 | Husain et al. | |
| 2008/0040467 A1 * | 2/2008 | Mendiratta et al. ........... | 709/223 |
| 2008/0049614 A1 | 2/2008 | Briscoe et al. | |
| 2008/0049621 A1 | 2/2008 | McGuire et al. | |
| 2008/0052206 A1 | 2/2008 | Edwards et al. | |
| 2008/0066145 A1 * | 3/2008 | Molen et al. ....................... | 726/1 |
| 2008/0071900 A1 | 3/2008 | Hecker et al. | |
| 2008/0163207 A1 | 7/2008 | Reumann et al. | |
| 2008/0189769 A1 | 8/2008 | Casado et al. | |
| 2008/0196100 A1 * | 8/2008 | Madhavan et al. .............. | 726/22 |
| 2008/0212963 A1 | 9/2008 | Fortin et al. | |
| 2008/0222727 A1 * | 9/2008 | Rothstein et al. ................ | 726/14 |
| 2008/0225780 A1 | 9/2008 | McCormick et al. | |
| 2008/0225853 A1 | 9/2008 | Melman et al. | |
| 2008/0240122 A1 | 10/2008 | Richardson et al. | |
| 2008/0291910 A1 | 11/2008 | Tadimeti et al. | |
| 2009/0083445 A1 | 3/2009 | Ganga | |
| 2009/0089625 A1 | 4/2009 | Kannappan et al. | |
| 2009/0113031 A1 | 4/2009 | Ruan et al. | |

(56) References Cited

U.S. PATENT DOCUMENTS

| | | | |
|---|---|---|---|
| 2009/0150527 A1 | 6/2009 | Tripathi et al. | |
| 2009/0161547 A1 | 6/2009 | Riddle et al. | |
| 2009/0222924 A1* | 9/2009 | Droz et al. | 726/24 |
| 2009/0235325 A1 | 9/2009 | Dimitrakos et al. | |
| 2009/0279536 A1 | 11/2009 | Unbehagen et al. | |
| 2009/0292858 A1 | 11/2009 | Lambeth et al. | |
| 2009/0303880 A1 | 12/2009 | Maltz et al. | |
| 2010/0046531 A1 | 2/2010 | Louati et al. | |
| 2010/0082799 A1 | 4/2010 | DeHaan et al. | |
| 2010/0115101 A1 | 5/2010 | Lain et al. | |
| 2010/0191612 A1 | 7/2010 | Raleigh | |
| 2010/0191846 A1 | 7/2010 | Raleigh | |
| 2010/0192207 A1 | 7/2010 | Raleigh | |
| 2010/0257263 A1 | 10/2010 | Casado et al. | |
| 2010/0275199 A1 | 10/2010 | Smith et al. | |
| 2011/0004913 A1 | 1/2011 | Nagarajan et al. | |
| 2011/0016215 A1 | 1/2011 | Wang | |
| 2011/0026521 A1 | 2/2011 | Gamage et al. | |
| 2011/0075664 A1 | 3/2011 | Lambeth et al. | |
| 2011/0075674 A1 | 3/2011 | Li et al. | |
| 2011/0119748 A1 | 5/2011 | Edwards et al. | |
| 2012/0290694 A9* | 11/2012 | Marl et al. | 709/223 |

FOREIGN PATENT DOCUMENTS

| | | |
|---|---|---|
| AU | 2013257420 | 12/2013 |
| CA | 2700866 | 3/2010 |
| CA | 2756289 | 9/2011 |
| CN | 1592252 | 3/2005 |
| CN | 1761209 | 4/2006 |
| EP | 0737921 | 10/1996 |
| EP | 1653688 | 5/2006 |
| EP | 2 193 630 | 6/2010 |
| EP | 2415221 | 10/2010 |
| EP | 2582091 | 4/2013 |
| EP | 2582092 | 4/2013 |
| EP | 2587736 | 5/2013 |
| EP | 2597816 | 5/2013 |
| JP | 2002-141905 | 5/2002 |
| JP | 2003-124976 | 4/2003 |
| JP | 2003-318949 | 11/2003 |
| JP | 2005-311863 | 11/2005 |
| WO | WO 95/06989 | 3/1995 |
| WO | WO 02/45315 | 6/2002 |
| WO | WO 2005/106659 | 11/2005 |
| WO | WO 2005/112390 | 11/2005 |
| WO | PCT/US08/52475 | 5/2008 |
| WO | WO 2009/042919 | 4/2009 |
| WO | WO 2010/115060 | 10/2010 |

OTHER PUBLICATIONS

HP Web Jetadmin Integration into HP OpenView Network Node Manager, Feb. 2004, pp. 1-12.*
HP Openview Enterprise Management, Jun. 2006, pp. 1-4.*
HP OpenView Network Node Manager SPI for IP Multicast software, May 2005, pp. 1-6.*
Managing Your Network with HP OpenView Network Node Manager, Mar. 2001, p. 221-222.*
International Search Report issued Apr. 2, 2009 in PCT/US2008/077950.
Casado, M., et al., "Ethane: Taking Control of the Enterprise", *Computer communication Review SIGCOMM '07*, Aug. 31, 2007, pp. 1-12.
Casado, et al., "SANE: A Protection Architecture for Enterprise Networks", *Proc. of the 15th USENIX Security Symp.*, Jul. 31, 2006, pp. 137-151.
Roch, "Nortel's Wireless Mesh Network Solution: Pushing the Boundaries of Traditional WLAN Technology", *Nortel Tech. Journal*, Jul. 31, 2005, pp. 1-6.
Written Opinion of PCT/US2008/077950, Jun. 24, 2009 (mailing date), Nicira Networks.
Portions of prosecution history of EP08834498.1, Nov. 29, 2010 (mailing date), Nicira Networks.
International Search Report and Written Opinion for PCT/US2010/029717, Sep. 24, 2010 (mailing date), Nicira Networks.
Author Unknown, Cisco VN-Link: Virtualization-Aware Networking, Mar. 2009, Cisco Systems, Inc.
Author Unknown, "Amazon EC2: Developer Guide, API Version Jan. 3, 2007 (API Version Jan. 3, 2007)," 2007 (Month NA), Amazon.Com, Inc., Seattle, Washington, USA.
Author Unknown, "Amazon EC2: Developer Guide (API Version Jan. 19, 2007)," 2006 (Month NA), Amazon.Com, Inc., Seattle, Washington, USA.
Author Unknown, "Amazon EC2: Developer Guide (API Version Jan. 3, 2007)," 2007 (Month NA), Amazon.Com, Inc., Seattle, Washington, USA.
Author Unknown, "Amazon Elastic Compute Cloud: Developer Guide (API Version Aug. 29, 2007)," 2007 (Month NA), Amazon.Com, Inc., Seattle, Washington, USA.
Author Unknown, "Amazon EC2: Developer Guide (API Version Jun. 26, 2006)," 2006 (Month NA), Amazon.Com, Inc., Seattle, Washington, USA.
Author Unknown, "Amazon EC2: Developer Guide (API Version Oct. 1, 2006)," 2006 (Month NA), Amazon.Com, Inc., Seattle, Washington, USA.
Author Unknown, "Introduction to VMware Infrastructure: ESX Server 3.5, ESX Server 3i version 3.5, VirtualCenter 2.5," Dec. 2007, Revision: 20071213, VMware, Inc., Palo Alto, California, USA.
Author Unknown, "iSCSI SAN Configuration Guide: ESX Server 3.5, ESX Server 3i version 3.5, VirtualCenter 2.5," Nov. 2007, Revision: 20071129, VMware, Inc., Palo Alto, California, USA.
Updated portions of prosecution history of EP 08834498, Jun. 9, 2011, Nicira Networks.
International Search Report for PCT/US2008/077950, Jun. 24, 2009 (mailing date), Nicira Networks.
International Preliminary Report on Patentability Report on Patentability for PCT/US2008/077950, Sep. 28, 2011 (completion date), Nicira Networks.
International Preliminary Report on Patentability Report on Patentability for PCT/US2010/029717, Jan. 13, 2012 (completion date), Nicira Networks.
Anderson, Thomas, et al., "Overcoming the Internet Impasse through Virtualization," Apr. 2005, pp. 34-41, IEEE Computer Society.
Author Unknown , "VMware for Linux Networking Support," month unknown, 1999, 5 pp., VMware, Inc.
Casado, Martin, et al., "Rethinking Packet Forwarding Hardware," month unknown, 2008, pp. 1-6.
Davoli, Renzo, "VDE: Virtual Distributed Ethernet," Feb. 2005, pp. 1-8, TRIDENTCOM'05, IEEE Computer Society.
Greenberg, Albert, et al., "A Clean Slate 4D Approach to Network Control and Management," Oct. 2005, 12 pp., vol. 35, No. 5, ACM SIGCOMM Computer Communication Review.
Gude, Natasha, et al., "NOX: Towards an Operating System for Networks," Jul. 2008, pp. 105-110, vol. 38, No. 3, ACM SIGCOMM Computer communication Review.
Lakshminarayanan, Karthik, et al., "Routing as a Service," month unknown, 2004, 16 pp., University of California, Berkeley, Berkeley, California.
Luo, Jianying, et al., "Prototyping Fast, Simple, Secure Switches for Ethane," month unknown, 2007, pp. 1-6.
McKeown, Nick, et al., "OpenFlow: Enabling Innovation in Campus Networks," Apr. 2008, pp. 69-74, vol. 38, No. 2, ACS SIGCOMM Computer communication Review.
Phan, Doantam, et al., "Visual Analysis of Network Flow Data with Timelines and Event Plots," month unknown, 2007, pp. 1-16, VizSEC.
Portions of prosecution history of U.S. Appl. No. 12/753,044, Jul. 24, 2012, Casado, Martin, et al.
Corrected International Preliminary Report on Patentability for PCT/US2008/077950, Jul. 2, 2012, (completion date), Nicira Networks.
Tavakoli, Arsalan, et al., "Applying NOX to the Datacenter," month unknown, 2009, 6 pp., Proceedings of HotNets.
Updated portions of prosecution history of U.S. Appl. No. 12/753,044, Feb. 19, 2013, Casado, Martin, et al.

(56) References Cited

OTHER PUBLICATIONS

Adya, Atul, et al., "Cooperative Task Management without Manual Stack Management," Jun. 2002, 14 pages, Proceedings of the Usenix Annual Technical Conference, Monterey, CA, USA.
Andersen, David, et al., "Resilient Overlay Networks," Oct. 2001, 15 pages, 18th ACM Symp. on Operating Systems Principles (SOSP), Banff, Canada, ACM.
Anhalt, Fabienne, et al., "Analysis and evaluation of a XEN based virtual router," Sep. 2008, pp. 1-60, Unite de recherché INRA Phone-Alpes, Montbonnot Saint-Ismier, France.
Author Unknown, "IEEE Standard for Local and metropolitan area networks—Virtual Bridged Local Area Networks, Amendment 5: Connectivity Fault Management," IEEE Std 802.1ag, Dec. 17, 2007, 260 pages, IEEE, New York, NY, USA.
Author Unknown, "Intel 82599 10 Gigabit Ethernet Controller: Datasheet, Revision: 2.73," Dec. 2011, 930 pages, Intel Corporation.
Author Unknown, "Private Network-Network Interface Specification Version 1.1 (PNNI 1.1)," The ATM Forum Technical Committee, Apr. 2002, 536 pages, The ATM Forum.
Author Unknown, "Single Root I/O Virtualization and Sharing Specification, Revision 1.0," Sep. 11, 2007, pp. 1-84, PCI-SIG.
Author Unknown, "Virtual Machine Device Queues," White Paper, Month Unknown, 2007, pp. 1-4, Intel Corporation.
Ballani, Hitesh, et al., "Making Routers Last Longer with ViAggre," NSDI'09: 6th USENIX Symposium on Networked Systems Design and Implementation, Apr. 2009, pp. 453-466, USENIX Association.
Barham, Paul, et al., "Xen and the Art of Virtualization," Oct. 19-22, 2003, pp. 1-14, SOSP'03, Bolton Landing New York, USA.
Bavier, Andy, et. al., "In VINI Veritas: Realistic and Controlled Network Experimentation," SIGCOMM'06, Sep. 2006, pp. 1-14, Pisa, Italy.
Caesar, Matthew, et al., "Design and Implementation of a Routing Control Platform," NSDI '05: 2nd Symposium on Networked Systems Design & Implementation, Apr. 2005, pp. 15-28, Usenix Association.
Cai, Zheng, et al., "The Preliminary Design and Implementation of the Maestro Network Control Platform," Oct. 1, 2008, pp. 1-17, NSF.
Cooper, Brian F., et al., "PNUTS: Yahoo!'s Hosted Data Serving Platform," VLDB'08, Aug. 24-30, 2008, pp. 1-12, ACM, Auckland, New Zealand.
Enns, R., "NETCONF Configuration Protocol," Dec. 2006, pp. 1-96, IETF Trust (RFC 4741).
Farinacci, D., et al., "Generic Routing Encapsulation (GRE)," Mar. 2000, pp. 1-9, The Internet Society (RFC 2784).
Farrel, A., "A Path Computation Element (PCE)—Based Architecture," Aug. 2006, pp. 1-40, RFC 4655.
Garfinkel, Tal, et al., "A Virtual Machine Introspection Based Architecture for Intrusion Detection," In Proc. Network and Distributed Systems Security Symposium, Feb. 2003, pp. 1-16.
Handley, Mark, et al., "Designing Extensible IP Router Software," Proc. of NSDI, May 2005, pp. 1-14.
Ioannidis, Sotiris, et al., "Implementing a Distributed Firewall," CCS'00, Month Unknown, 2000, 10 pages, ACM, Athens, Greece.
John, John P., et al., "Consensus Routing: The Internet as a Distributed System," Apr. 2008, pp. 1-14, Proc. of NSDI.
Kim, Changhoon, et al., "Floodless in Seattle: A Scalable Ethernet Architecture for Large Enterprises," SIGCOMM'08, Aug. 17-22, 2008, pp. 3-14, ACM, Seattle, Washington, USA.
Kohler, Eddie, et al., "The Click Modular Router," ACM Trans. on Computer Systems, Aug. 2000, pp. 1-34, vol. 18, No. 3.
Labovitz, Craig, et al., "Delayed Internet Routing Convergence," SIGCOMM '00, Month Unknown, 2000, pp. 175-187, Stockholm, Sweden.
Labovitz, Craig, et al., "Internet Routing Instability," ACM SIGCOMM '97, Month Unknown, 1997, pp. 1-12, Association for Computing Machinery, Inc.
Maltz, David A., et al., "Routing Design in Operational Networks: A Look from the Inside," SIGCOMM'04, Aug. 30-Sep. 3, 2004, 14 pages, ACM, Portland, Oregon, USA.
Partridge, Craig, et al., "A 50-Gb/s IP Router," IEEE/ACM Transactions on Networking Jun. 1998, pp. 237-248.
Peterson, Larry L., et al., "OS Support for General-Purpose Routers," Month Unknown, 1999, 6 pages.
Rosen, E., et al., "Applicability Statement for BGP/MPLS IP Virtual Private Networks (VPNs)," The Internet Society, RFC 4365, Feb. 2006, pp. 1-32.
Spalink, Tammo, et al., "Building a Robust Software-Based Router Using Network Processors," Month Unknown, 2001, pp. 216-229, ACM, Banff, CA.
Turner, Jon, et al., "Supercharging PlanetLab—High Performance, Multi-Application Overlay Network Platform," SIGCOMM-07, Aug. 27-31, 2007, 12 pages, ACM, Koyoto, Japan.
Turner, Jonathan S., "A Proposed Architecture for the GENI Backbone Platform," ANCS'06, Dec. 3-5, 2006, 10 pages, ACM, San Jose, California, USA.
Wang, Yi, et al., "Virtual Routers on the Move: Live Router Migration as a Network-management Primitive," SIGCOMM 08, Aug. 17-22, 2008, 12 pages, ACM, Seattle, Washington, USA.
Xie, Geoffrey G., et al., "On Static Reachability Analysis of IP Networks," Month Unknown, 2005, pp. 1-14.
Yang, L., et al., "Forwarding and Control Element Separation (ForCES) Framework," Apr. 2004, pp. 1-41, The Internet Society.
Portions of prosecution history of AU2008304243, Aug. 1, 2013 (mailing date), Nicira, Inc.
Updated portions of prosecution history of EP08834498.1, Oct. 25, 2013 (mailing date), Nicira, Inc.
Portions of prosecution history of EP12196134.6, Dec. 3, 2013 (mailing date), Nicira, Inc.
Portions of prosecution history of EP12196139.5, Dec. 17, 2013 (mailing date), Nicira, Inc.
Portions of prosecution history of EP12196147.8, Feb. 11, 2014 (mailing date), Nicira, Inc.
Portions of prosecution history of EP12196151.0, Jan. 20, 2017 (mailing date), Nicira, Inc.
Portions of prosecution history of AU2010232526, Oct. 17, 2013 (mailing date), Nicira, Inc.
Portions of prosecution history of EP10716930.2, Apr. 10, 2014 (mailing date), Nicira, Inc.
Phaal, Peter, et al., "sFlow Version 5," Jul. 2004, 46 pages, available at http://www.sflow.org/sflow_version_5.txt.
Shenker, Scott, et al., "The Future of Networking, and the Past of Protocols," Dec. 2, 2011, 30 pages, USA.
Updated portions of prosecution history of U.S. Appl. No. 12/753,044, Jun. 10, 2014, Casado, Martin, et al.
Updated portions of prosecution history of AU2010232526, Jun. 13, 2014 (mailing date), Nicira, Inc.
Portions of prosecution history of CA2756289, May 29, 2014 (mailing date), Nicira, Inc.
Wang, Wei-Ming, et al., "Analysis and Implementation of an Open Programmable Router Based on Forwarding and Control Element Separation," Sep. 2008, pp. 769-779, Journal of Computer Science and Technology.

\* cited by examiner

NETWORK OPERATING SYSTEM FOR MANAGING AND SECURING NETWORKS

CROSS-REFERENCE TO RELATED APPLICATIONS

The present Application claims priority from U.S. Provisional Patent Application No. 60/995,435, filed Sep. 26, 2007, titled "Flow Based Network Operating System" and to U.S. Provisional Patent Application No. 61/010,985, filed Jan. 14, 2008, titled "Network Operating System for Managing and Securing Enterprise Networks," which applications are hereby incorporated herein in their entirety for all purposes.

REFERENCE TO COMPUTER PROGRAMS

The present Application incorporates by reference herein the contents of the compact disc labeled "CD 1 Copy I" which is provided in Appendix A together with a duplicate labeled "CD 1 Copy II." The contents of the CD1 compact discs include the file: nox-0.3.0.-pre.tar.gz, created on Sep. 25, 2008 which is 25.819 MB in size.

The present Application incorporates by reference herein the contents of the compact disc labeled "CD 2 Copy I" which is provided in Appendix A together with a duplicate labeled "CD 2 Copy II." The contents of the CD2 compact discs include the file: openflow.tar.gz, created on Sep. 25, 2008 which is 288 KB in size.

BACKGROUND OF THE INVENTION

1. Field of the Invention

The present invention relates generally to computer network management and security and more particularly to scalable and autoconfigurable systems and methods for controlling networks.

2. Description of Related Art

Many current enterprises have large and sophisticated networks comprising links, switches, hubs, routers, servers, workstations and other networked devices, which support a variety of connections, applications and systems. Co-pending application Ser. No. 11/970,976, now published as U.S. Pat. Publication 2008/0189769, filed Jan. 8, 2008, the contents of which are incorporated herein by reference, advanced the state of the art of network management. However, despite these and other significant commercial and academic efforts to ease the burden of network administrators, these networks remain difficult to manage and secure.

Certain of the problems encountered by these network administrators can be best illustrated with reference to differences in the development of host and network operating systems. In the early days of computing, programs were written in machine languages that had no common abstractions for the underlying physical resources. This made programs hard to write, port, reason about, and debug. Modern operating systems were developed to facilitate program development by providing controlled access to high-level abstractions for resources such as memory, storage, communication and information in files, directories, etc. These abstractions enable programs to carry out complicated tasks on a wide variety of computing hardware.

In contrast, networks are typically managed through low-level configuration of individual components. Network configurations often depend on the underlying network: for example, blocking a user's access with an access control list ("ACL") entry requires knowing the user's current IP address. More complicated tasks require more extensive network knowledge: forcing guest users' port 80 traffic to traverse an HTTP proxy requires knowing the current network topology and the location of each guest. Conventional networks resemble a computer without an operating system, with network-dependent component configuration playing the role of hardware-dependent machine-language programming.

BRIEF SUMMARY OF THE INVENTION

Certain embodiments of the invention provide systems and methods for controlling global routing and other forwarding behaviors (including network address translation, encryption, encapsulation, stateful tunneling, and various forms of quality-of-service). These decisions can be made individually for each flow, in real-time as the flow begins, and can be based on general policies that are expressed in terms of high-level names (for hosts, users, services, etc.). The implementation of these policies can be independent of the network topology, and the implementation remains valid as users and hosts move, and the network changes. Certain embodiments of the invention can be implemented using the ACL functionality provided for in most commercial switching chips.

Certain embodiments of the invention provide systems and methods for maintaining a comprehensive network view. In some of these embodiments, the network view comprises a topology of network elements. In some of these embodiments, the network view identifies location of entities, the entities including users, services and hosts. In some of these embodiments, a history of the network view, along with a history of network flows, is maintained.

Certain embodiments of the invention provide a centralized programmatic interface that gives high-level languages access to a network view, notification of network events including flow initiations and changes in the network view and control mechanisms for controlling network elements. The system may provide real-time per-flow control of global routes. In some of these embodiments, the system controls the path of the flow through the network, and the handling of the flow by network elements. In some of these embodiments, the system is scalable through strict separation of consistency requirements, with only the network view requiring global consistency. In some of these embodiments, decisions regarding a flow are based on the global network view and the flow state. In some of these embodiments, this allows separating a consistent but slowly changing network view from local but rapidly changing parameters. In some of these embodiments, flow state is processed independently by each of a plurality of controllers.

Certain embodiments of the invention provide methods for autoconfiguring a network. In some of these embodiments, autoconfiguring includes automatically detecting new devices and services connected to the network. In some of these embodiments, autoconfiguring includes automatically updating flow entries and other configuration information. In some of these embodiments, this automatic updating of flow entries and other configuration information allows the implementation of global directives ("policies") to be maintained in the face of various network changes.

Certain embodiments of the invention provide support for intelligent interception of packets, enabling hosts to remain in a reduced power mode.

Certain embodiments of the invention provide support for virtual environments including support for migrating VMs. In some of these embodiments, wherein multiple VMs are associated with certain devices, the system allows for control of communications between these co-resident VMs. In some of these embodiments, in-band control is used to manage devices. In some of these embodiments, switches are controlled using ACL functionality to provide global functionality.

Certain embodiments of the invention provide support for managing and securing multiple networks through a single system.

Certain embodiments of the invention provide support for having multiple management systems share control of a single network infrastructure, enabling different administrative authorities to split control.

Certain embodiments of the invention provide systems and methods for managing a network. Some of these embodiments comprise maintaining a network view of current state of the network, the current state of the network characterizing network constituents and a network topology, the network constituents including network entities and network elements currently addressable on the network, announcing events corresponding to changes in the state of the network and configuring one of the network elements based on the network view and one of the events. In some of these embodiments, the network entities include network users. In some of these embodiments, the network view is accessed by one or more network management applications. In some of these embodiments, the current state of the network includes location of the network constituents. In some of these embodiments, the current state of the network further characterizes data flows in the network.

DETAILED DESCRIPTION OF THE INVENTION

Figure 1A:
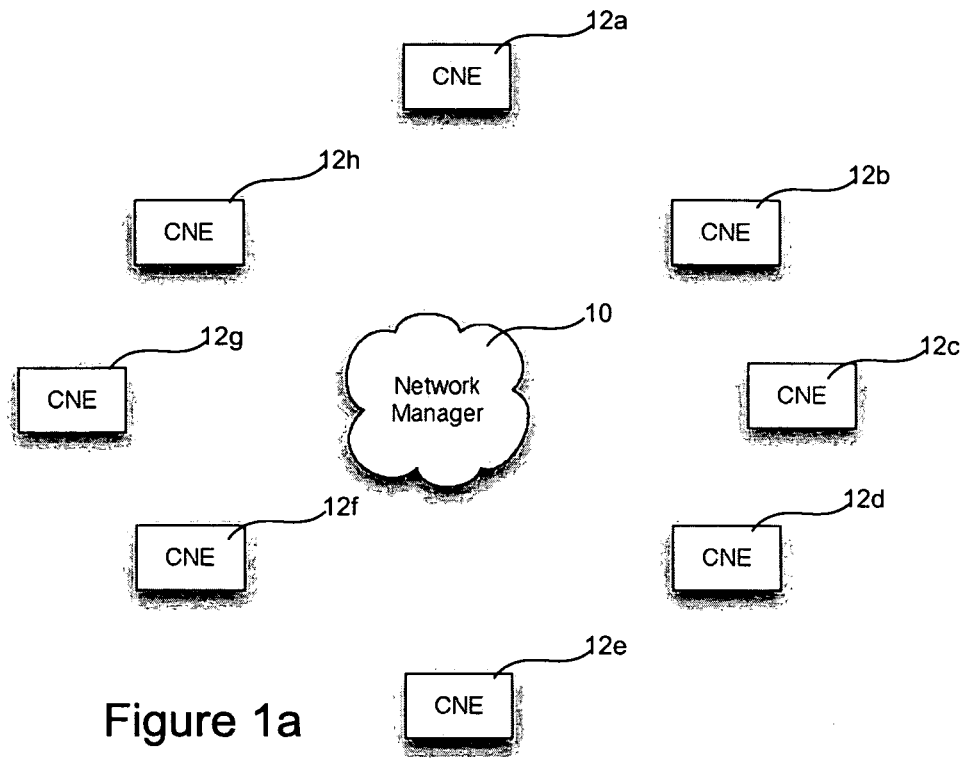
FIGS. 1a and 1b are block schematic representations of a network manager and network elements according to certain aspects of the invention.

Embodiments of the present invention will now be described in detail with reference to the drawings, which are provided as illustrative examples so as to enable those skilled in the art to practice the invention. Notably, the figures and examples below are not meant to limit the scope of the present invention to a single embodiment, but other embodiments are possible by way of interchange of some or all of the described or illustrated elements. Wherever convenient, the same reference numbers will be used throughout the drawings to refer to same or like parts. Where certain elements of these embodiments can be partially or fully implemented using known components, only those portions of such known components that are necessary for an understanding of the present invention will be described, and detailed descriptions of other portions of such known components will be omitted so as not to obscure the invention. In the present specification, an embodiment showing a singular component should not be considered limiting; rather, the invention is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the components referred to herein by way of illustration.

Certain embodiments of the invention provide systems and methods for managing and securing data communication networks. These systems and methods typically support scalable and autoconfigurable programmatic control over network elements, providing a comprehensive view of the network and per-flow control over network traffic. Aspects of the present invention permit the integration and control of conventional commercial switches as well as providing new features and functionality for network systems configured and adapted for use in embodiments of the invention.

Data communication networks can include interconnected switches, virtual switches, hubs, routers and other devices configured to handle data as it passes through the network. These devices will be referred to herein as "network elements." Data is communicated through the data communications network by passing data packets, cells, frames, segments, etc. between the network elements using one or more communication links. Communication links can be multi-segmented and can employ wired, wireless, optical and so on. In one example, a packet may be handled by multiple network elements and cross multiple segments of plural communication links as it travels over the network between a source and destination.

Sources and destinations may be considered endpoints on the network, even where a source receives data from a different source or where destination also forwards received data to another destination on the network. Various endpoint systems can reside on the network, including client machines, virtual machines ("VMs"), servers and systems that provide a variety of network services, typically using a server such as a web server, an Email server, a file server, etc. Users may be logged into one or more of these endpoint systems including servers, workstations, personal computers and mobile communications devices. Endpoint systems, along with the users and services that reside on them, will be referred to herein as "network entities."

For the purposes of this discussion, network entities and network elements can be referred to collectively as "network constituents" and the singular use of the term (viz. "network constituent") can mean either a network element or network entity. It will be appreciated that special cases exist in which certain network elements may act as network entities and vice versa. For example, a network switch may provide terminal service to accommodate system administration and a user workstation may serve as a bridge or gateway to a wireless device, forwarding network data. In these special cases, the different functionalities of the devices will be treated separately and independently, except where described otherwise.

Certain embodiments of the present invention comprise an operating system for networks. The operating system provides a uniform and centralized programmatic interface to the entire network. The network operating system enables observation and control of the network although the network operating system need not manage the network itself. The network operating system typically provides a programmatic interface upon which applications can be built and/or implemented in order to perform the network management tasks. In this description, the term "application" will refer to programs running on the network operating system unless stated otherwise.

Network operating systems according to certain aspects of the invention embody conceptual departures from conventional network management systems. For example, the network operating system presents programs with a centralized programming model, including a logically centralized view of network state, and applications can be written as if the entire network were present on a single machine. Consequently, the application can compute shortest paths using Dijkstra rather than Bellman-Ford methods. In another example, applications can be written in terms of high-level abstractions including, e.g., user names and host names, rather than low-level configuration parameters such as IP addresses and MAC addresses. This abstraction permits management and security policies to be enforced independent of the underlying network topology. The network operating system maintains current and accurate mappings or bindings between abstractions and corresponding low-level configurations.

In certain embodiments, the network operating system allows management applications to be written as centralized programs over high-level names as opposed to the distributed algorithms over low-level addresses. More specifically, certain embodiments of the present invention comprise systems and methods for managing and securing networks in a manner that allows operators to use centralized declarative statements (herein referred to as "directives") to control the network and to enforce desired policies. Instead of configuring each individual network component, a network operator can merely create one or more network-wide directives that the system will enforce by ensuring that network components under control of the network operating system implement the desired behavior.

Certain embodiments of the invention provide a general programmatic interface. This allows network operators to specify directives using a high-level language such as C++ and Python. In certain embodiments systems and methods are provided that address issues associated with security, management, network control, scaling and backwards compatibility, autoconfiguration, virtual environments, in-band control, history and forensics, routing, packet interception, and denial-of-service protection.

Certain embodiments of the invention define and comprise an operating system for networks referred to hereinafter as "NOX." NOX enables network operators to observe and control data communications networks, including certain network elements and network entities. NOX typically maintains a current view of the entire network, including current topology, current services offered, and current location of hosts, services and authenticated users. Offered services may include standards-defined services such as HTTP and NFS and may also include proprietary services known to NOX or which NOX can characterize. NOX may facilitate control of a network by providing an execution environment in which management applications can access the network view maintained by NOX. Management applications include components that monitor and control at least a portion of the data communications network, where the portion may be defined by one or more domains, one or more types of network elements, one or more components under a particular administrative control and/or a physical area. Management applications may be registered with NOX in order to receive notification of network events and to facilitate management of network components.

For the purposes of the following examples, a "network" can be taken to mean a set of switches, routers, firewalls, proxies and other network elements interconnected by a layer 2 network such as Ethernet, ATM, a layer 3 network employing, for example Internet protocol ("IP") and/or other suitable networking technology. Links between network elements may be local-area or wide-area in nature and/or any combination thereof. Users and entities, such as hosts, servers, and other devices may be connected to the network and may be said to reside on the network. Regardless of the specific network architecture, homogeneity, heterogeneity, component parts and configuration of network entities, a NOX-based system can be deployed to monitor and control the network.

For the purposes of the following examples, a "flow" is understood to be a series of packets or other network transmission units that share a common characteristic. Typically, this common characteristic can be detected by network elements and used to apply similar behavior to each packet. For example, a flow may comprise a series of packets having the same packet header or sharing certain specified portions of the packet header.

Figure 1B:
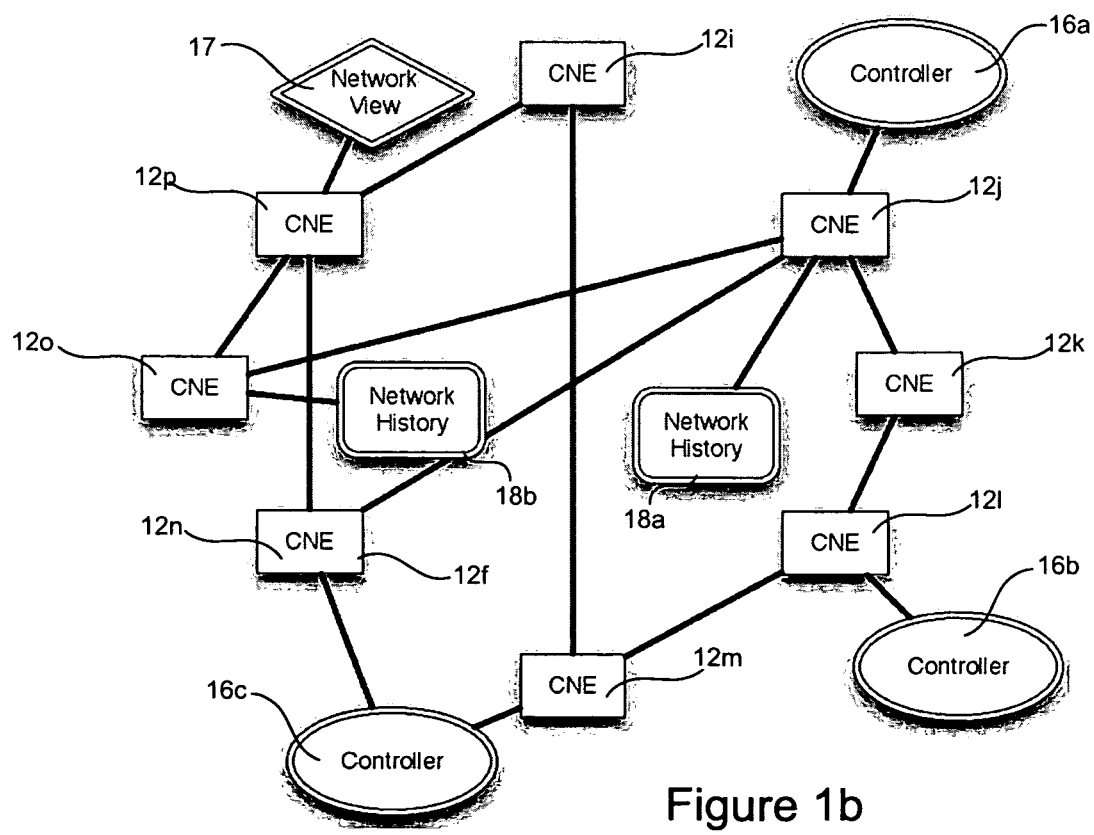

Reference is now made to FIGS. 1a and 1b. FIG. 1a depicts the presence of controllable network elements ("CNEs") and a network manager. FIG. 1b depicts an example of a network having links shown by lines and showing various "CNEs," three instances of devices hosting network controllers 16a-c, two instances of devices containing the network history 18a and 18b, and one device that maintains the network view 17. In certain embodiments, a system comprises a network manager 10 and one or more controllable network elements 12a-12h and 12i-12p including switches and/or other network elements. With particular reference to FIG. 1a, the network manager 10 includes plural logical components including network controllers, a network-view database and a network-history database. These logical components may be hosted on network-attached servers or other devices connected to the network. Thus, network manager 10, depicted as a distributed entity can reside on a dedicated processing device, or be distributed across multiple processing devices such as Linux servers, UNIX servers, Windows servers, etc. Furthermore, the network manager 10 may aggregate information gathered and/or processed by network elements 12a-12h. One or more network controllers, whether resident on a common server or different servers can each execute an instance of NOX and the set of management applications. NOX typically provides a programmatic interface, while the management applications provide advanced network management capabilities.

In FIG. 1a, network manager 10 is depicted in a cloud indicating its potentially distributed nature, and the connections between the other network elements (not shown in the figure) can be arbitrary. FIG. 1b shows a more specific example of interconnections between network elements, along with the placement of the various components of the network manager, including controllers 16a-16c, network view 17 and histories 18a-18b. As shown in FIG. 1b, various components of the network manager may be connected to the network in different places, and can communicate directly with certain of network elements 12i-12p and can communicate with certain other of network elements 12i-12p only indirectly, based on network configuration and the placement of components of the network manager. For example, network manager may be provided in a single server, or in several servers located throughout the network. These servers may also support other services, applications and users may be logged in to them. These servers may also function as network elements (by acting as a switch, for example). In examples where a controller function is housed on the same server as other network elements, the network manager may communicate with network elements without a network, using, for example, a common bus, common memory, interprocess channels and other schemes for communication. Thus the connections depicted in FIG. 1b should be read as encompassing any form of communication and control.

Figure 2:
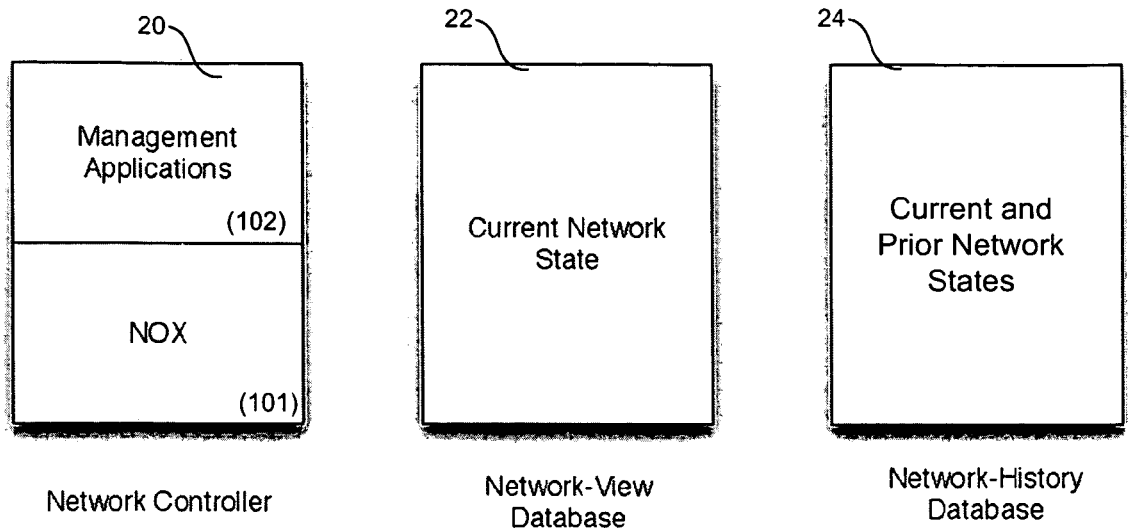
FIG. 2 is a block schematic showing components of a network manager according to certain aspects of the invention.

Referring also to FIG. 2, in certain embodiments, network manager 10 maintains a network view 22 describing the current state of the network. The network state comprises information describing current network topology, current location of hosts, users and network services identified as residing on the network. The current state may be recorded in terms of bindings between high-level names, including names for users, hosts, services, etc., and low-level addresses including addresses for hosts, network elements, etc. Typically, a single logical version of the network view is available, although copies of the view or portions of the view may be maintained and stored on one or more network-attached servers or other network devices.

In certain embodiments, a network history 24 maintains a comprehensive recording of past network state, including topology, location of entities, etc. The network history 24 enables an operator to recreate previous states of the network at certain specified instances in time. This network history 24 can be queried using a predefined query language. Typically, a single logical version of this history 24 is maintained, although the history 24 may be embodied in one or more network-attached servers or other network devices. Analysis of the network view and of this history may be used to generate network alerts. These alerts may complement or substitute for event detection capabilities of network elements. For example, an examination of successive network states can identify the loss of connection, enabling a policy-driven alert to be generated by the network manager 10 and/or by applications using the network operating system 101.

In certain embodiments controllable switches and other network elements can be controlled by network manager 10. In one example, these switches implement and support the OpenFlow interface, whereby switches are represented by flow-tables with entries taking the form: (header: counters, actions). However, the invention is not limited to this OpenFlow example, and those skilled in the art will recognize other alternatives after being taught by the present examples. The specified header fields might be completely defined, and only packets matching the complete header are chosen. Alternatively, the flow entry's header specification might contain wildcard values or "ANYs" providing a TCAM-like match to flows In this case, a packet may be assigned to a flow based on a match with a subset of the header. In certain embodiments, the header need not correspond to the traditional notion of a header, but can be defined as an arbitrary set of bits in the incoming packet. Only packets that share the specified set of bits are considered to match the specified header. For each packet handled that matches an identified header, the corresponding counter can be updated and one or more of the specified actions can be initiated. Packets can match multiple flow headers and may be assigned to a flow according to preconfigured rules. In one example, a configuration may dictate that a packet matching multiple flow header entries be assigned to the highest priority flow entry.

Regarding OpenFlow, currently supported actions can include forward as default, forward out specified interface, deny, forward to network controller and modify various packet header fields, wherein the packet header fields to be modified can include VLAN tags, source and destination IP address and port number. In one example, the "forward as default" action causes the switch to effectively ignore NOX because the packet is forwarded as if the switch is forwarding the packet using its traditional software. Other actions and functions consistent with the OpenFlow specification may be supported. (See the OpenFlow documentation and source code available at http://www.openflowswitch.org/.)

Certain embodiments may implement other abstractions for switch behavior, and these may support a different set of actions. These other actions might include network address translation, encryption, encapsulation, stateful tunneling, and various forms of quality-of-service ("QoS"). In addition, the counters and actions may be predefined and/or can be configured by users and network management applications. Abstractions such as the OpenFlow switch abstraction may permit management applications to insert flow-table entries, delete flow-table entries, manage priorities of flow-table entries, and read flow-table counters. These entries can be set up on application startup or in response to a network event. OpenFlow and similar abstractions for network elements may also provide a set of messages that allow for broader communication between a controller and the element. Examples of such messages are: switch join, switch leave, packet received, and switch statistics.

Figure 6:
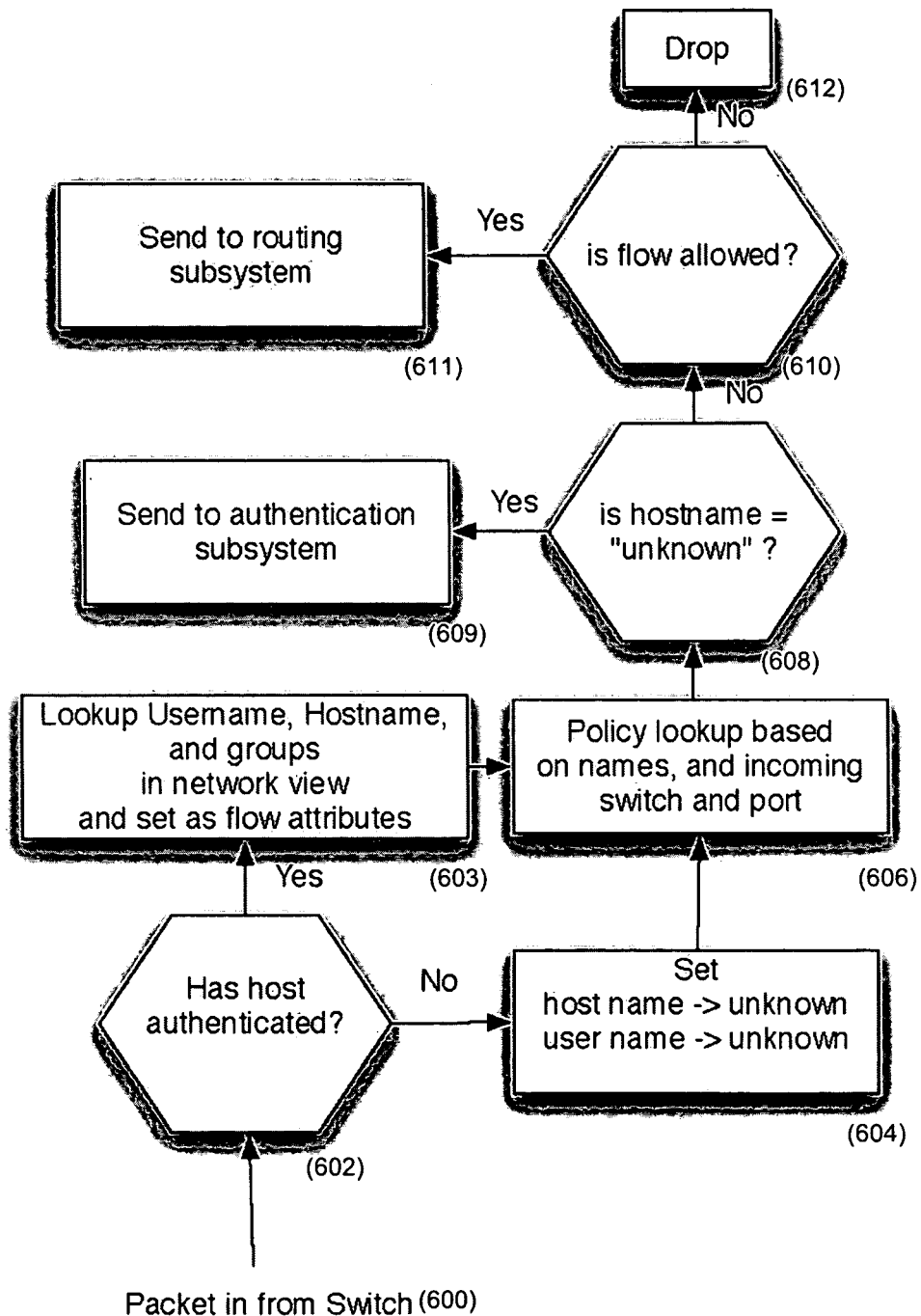
FIG. 6 depicts an example of host authentication within NOX according to certain aspects of the invention.

Certain operations of a NOX-controlled data communications network will now be discussed. FIG. 6 discussed in more detail below, describes one example of the processing that can occur for incoming packets. In certain embodiments, packets or other data units encountered by a NOX-controlled network element may be analyzed and categorized. Packets can be generated by any network-attached device and when a packet reaches a NOX-controlled network element, the packet header or another attribute of the packet is examined to determine a flow to which the packet should be assigned. For example, if the header of the incoming packet matches the specified fields in one of the flow entries of a switch, the switch can assign the packet to the flow and may update appropriate counters and apply corresponding actions. However, if the packet does not match a flow entry, it is typically forwarded to a network controller which may inspect the packet and make a decision about how to handle the packet and/or flow corresponding to the packet. The decision is taken based on information in the network view, predefined rules and policy directives. For example, the flow handling decision may cause one or more actions including actions that cause the switch and/or controller to drop the packet, set up a path by inserting a flow entry in each switch along a path to the packet destination and forward the packet to the destination without setting up a flow entry.

In some instances, packets that are unmatched to an existing flow entry are the first packet of a flow (a "flow-initiation packet") and subsequent packets can be anticipated that match a flow entry created in response to the flow-initiation packet. In certain embodiments, the controller may not insert any flow entries in response to a flow initiation and, consequently, the controller will continue to receive all packets in that flow. In one example, this might be done so the controller can see all DNS traffic. In certain embodiments, the system may be configured to determine flow information from the packet and insert flow entries after receiving a portion of the first packet, or after receiving more than the first packet. In certain embodiments, management applications decide on the method of handling individual flows. Control decisions can be communicated through the NOX programmatic interface.

With continuing reference to FIG. 2, certain embodiments comprise a programmatic interface that provides various services to applications 20. The programmatic interface may provide an application with access to the network view 22 and historical views 24. Typically, an application 20 can query the network view 22, using information in the response to determine actions to be taken and/or the extent of action to be taken. The programmatic interface may provide an application with alerts associated with network events. In one example, an application can be registered with a notification service in order to be notified about certain network events. The programmatic interface may enable an application 20 to control network elements. For example, applications may use a control interface such as OpenFlow to modify the behavior of network elements.

Certain embodiments monitor and report different categories of network events. The categories may include events reflecting changes in the network view such as insertion of a new host, authentication of a new user and changes in network topology, events reflecting flow initiations and other packets arriving at a controller, events generated directly by OpenFlow messages such as switch join, switch leave, packet received and receipt of switch statistics and events generated by NOX applications as a result of processing other low-level events and/or other application-generated events. For example, a management application designed to detect "scanning hosts" could generate an event when such a host was detected. This scanning application may, in turn, rely on lower-level events (such as flow initiations) to detect scanners.

In certain embodiments, NOX applications use a set of registered handlers that are configured to be executed when certain identified events or categories of events occur. Event handlers are typically executed in order of priorities specified during handler registration. A handler may return a value to NOX that indicates whether execution of handlers associated with the event should be halted, or handling of the event should be passed to the next registered handler. In certain embodiments, an application handling an event may take one or more actions, including updating the network view 22, inserting flow entries into one or more network elements and generating additional network events.

Figure 3:
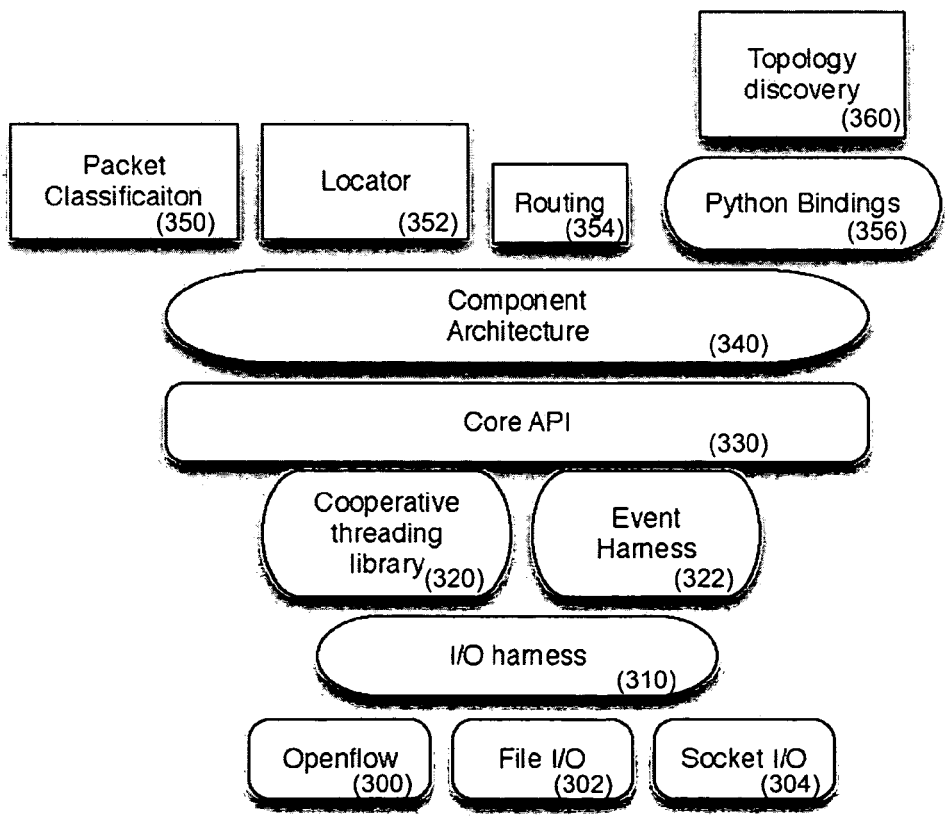
FIG. 3 depicts certain NOX core components according to certain aspects of the invention.

The NOX core preferably includes the base software infrastructure upon which other components are built. In one example, the NOX core may provide an asynchronous communication harness, an event harness, a cooperative threading library, a component architecture and a set of built-in system libraries that provide functions common to network applications. FIG. 3 provides a high level view of certain NOX core components in one embodiment. I/O harness 310 provides an asynchronous interface to system input and output ("I/O") functions 300, 302 and 304 including functions that manage connections to network switches, functions that handle communication with file systems and functions that provide a socket interface supporting general network services such as a management web server.

Event harness 322 includes components that manage the creation and distribution of system events. A system event can include network level events, such as insertion of a switch into the network or the arrival of a new flow and events created by an application 20 such as a "scan detected" event created by an application 20 that detects a scanning host.

The cooperative threading library 320 provides a convenient interface for managing concurrent threads of execution. Each I/O event is typically executed within a separate thread context. This allows applications to provide linear program flow across communication boundaries while avoiding the performance penalties associated with blocking I/O. In the example, NOX core 101 supports a fully asynchronous communication model in which applications 20 specify interest in a particular event by registering a callback corresponding to the event. Applications 20 can use both cooperative threading and callbacks.

The cooperative threading 320, event harness 322 and I/O infrastructure components 300, 302 and 304 preferably provide the basis for a core application programming interface ("API") 330 that can be exposed to applications 20. These components provide methods for declaring and resolving dependencies between applications, support for dynamic loading of applications 20, and an interface to the core API.

In certain embodiments, the NOX core 101 may also comprise a small set of applications that provide functionalities common to network applications 20. These functionalities may include packet classification 350, language bindings 356, location 352, routing 354 and topology discovery 360. Packet classification 350 provides a generic interface in which applications 20 can specify which type of packets they are interested in; a classifier then ensures that the application 20 only receives these packets. Programming language bindings 356 allow applications to be written in different programming languages. In the example depicted, a Python programming language binding permits application development in the Python language when the core NOX 101 is implemented in a different language such as C++. Programming language bindings 356 permit fast prototyping of functionality and high-level implementation of non-performance critical functionality. Other examples of programming language bindings 356 include bindings for Java and Ruby.

A locator application 352 comprises logic and data used to determine when new hosts have joined or left the network. In certain embodiments, locator application 352 provides data to the network view 22. Locator application 352 typically tracks the network state associated with a host, including the location of the host on the network, which is often determined by the physical port to which it is attached, and the addresses allocated to the host. This information can be used to generate host join/leave events and may also be used by a routing application to determine the physical locations of the source and destination of a flow to be set up in the network and to modify the forwarding behavior of network elements traversed by the flow.

The network view 22 may be constructed through the individual contributions of a plurality of network controllers. Locator applications 352, topology discovery applications 360 and other components of a controller can typically modify the network view 22. In one example, a composite view is constructed by the controllers inserting the pieces of the network view 22 that they know or "see" and the resulting current composite network view 22 may then be shared with all controllers. In certain embodiments, the composite network view 22 is kept cached on each controller and is updated when there is an update of the composite network view 22. The caches on the controllers may be maintained by a routing application, for example. The composite view 22 need not be stored on a single server and it could easily be stored in a distributed hash table ("DHT") spread across a plurality of servers, which may also serve as host to one or more controllers.

Routing application 354 preferably calculates available and/or active paths on the network. Paths may be calculated using a "dynamic all-pairs shortest path" algorithm that is incrementally updated upon link changes. Other path calculation may be used as appropriate or desired. When a controller receives a flow which requires routing, the controller may determine or select the route based on, for example, the physical ports to which the source and destination media access control ("MAC") address are connected as identified by the packet and/or flow. Routing application 354 can also accept a number of constraints on the path including, for example, identification of one or more intermediate nodes through which the flow must pass. In one example, the path can be calculated on demand using a multi-hop Djikstra algorithm. The routing application 354 can also compute multipath and multicast paths using standard techniques. The calculation of the multiple paths can include, as a constraint, varying degrees of disjointness such that the degree of overlap between the paths can be controlled. Having calculated paths for a data flow, routing application may cause the modification of forwarding behavior of one or more network element in order to implement the calculated path.

The topology discovery application 360 can use LLDP packets to detect node and link level network topology. Detection can be accomplished by sending a unique LLDP packet from each switch port and determining a connected port upon receipt of such a packet. This information is typically stored internal to the controller and may used by a plurality of NOX components, including routing components. Topology discovery can be performed at a controller or implemented at the switches.

Figure 4:
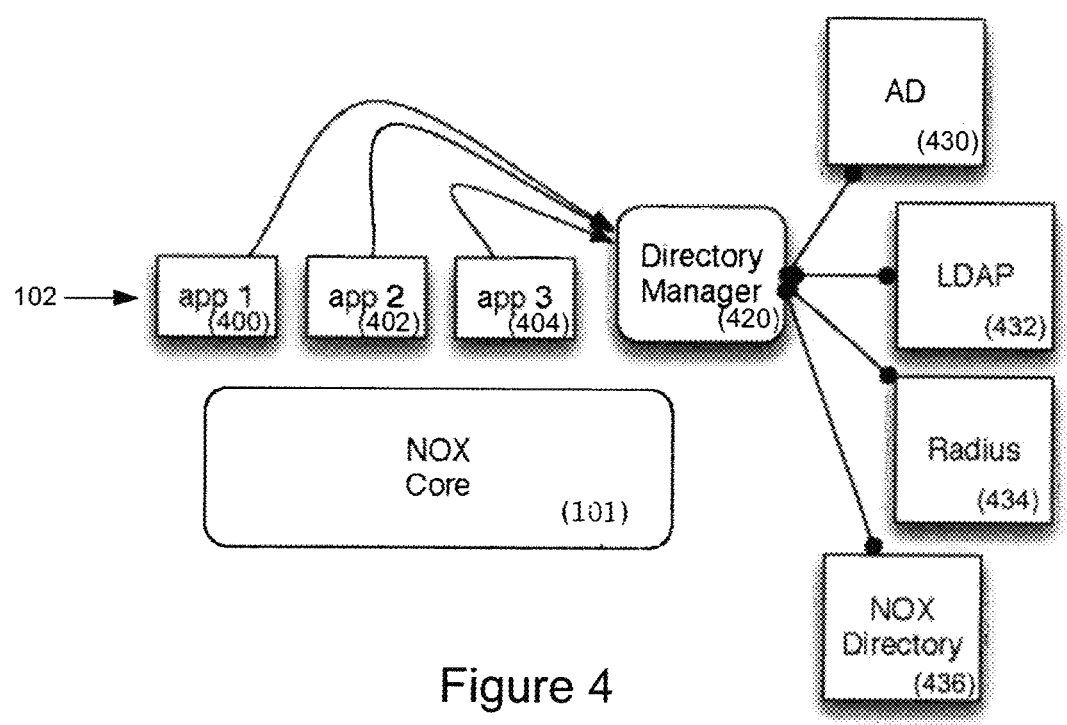
FIG. 4 depicts a directory manager and its integration with a system according to certain aspects of the invention.

Certain embodiments support directory integration. With reference to FIG. 4, NOX may provide an abstracted interface to one or more local or remote directory services 430, 432, 434 and 436 through a directory manager component 420. Directory services such as LDAP 432 or AD 430 comprise information regarding network resources including user, host, groups and service names. In addition, directory services 430, 432, 434 and 436 generally operate as "authentication stores," maintaining the credentials required to authenticate a user, host or switch to the network.

In certain embodiments, directories may be used to authenticate users, switches and hosts and, further, to provide associated metadata concerning the characteristics of the users, switches and hosts. For example, the directory may maintain information regarding the groups to which a user and/or host belongs. According to certain aspects of the invention, applications 400, 402, 404 may be written to interface with the directory manager 420 and a new directory may be added by building a directory-specific back-end which plugs into the directory manager infrastructure. Typically the addition of a new directory does not require any change to the applications. Directories can be stored and operated on the same device on which NOX is running and can also be stored and operated on other network devices.

In certain embodiments, the NOX directory manager 420 can expose interfaces to a plurality of directories. These interfaces may include interfaces that: access user/host/switch credentials received at authentication time, determine a switch name from switch authentication information, determine a port name based on a switch and port number, determine hosts, switches and/or locations associated with a user, determine known MAC and IP addresses associated with a host, determine the function of a host, e.g. whether the host acts as a gateway or a router, determine associations between users and hosts and add/remove/modify entries in the directory or directories.

Figure 5:
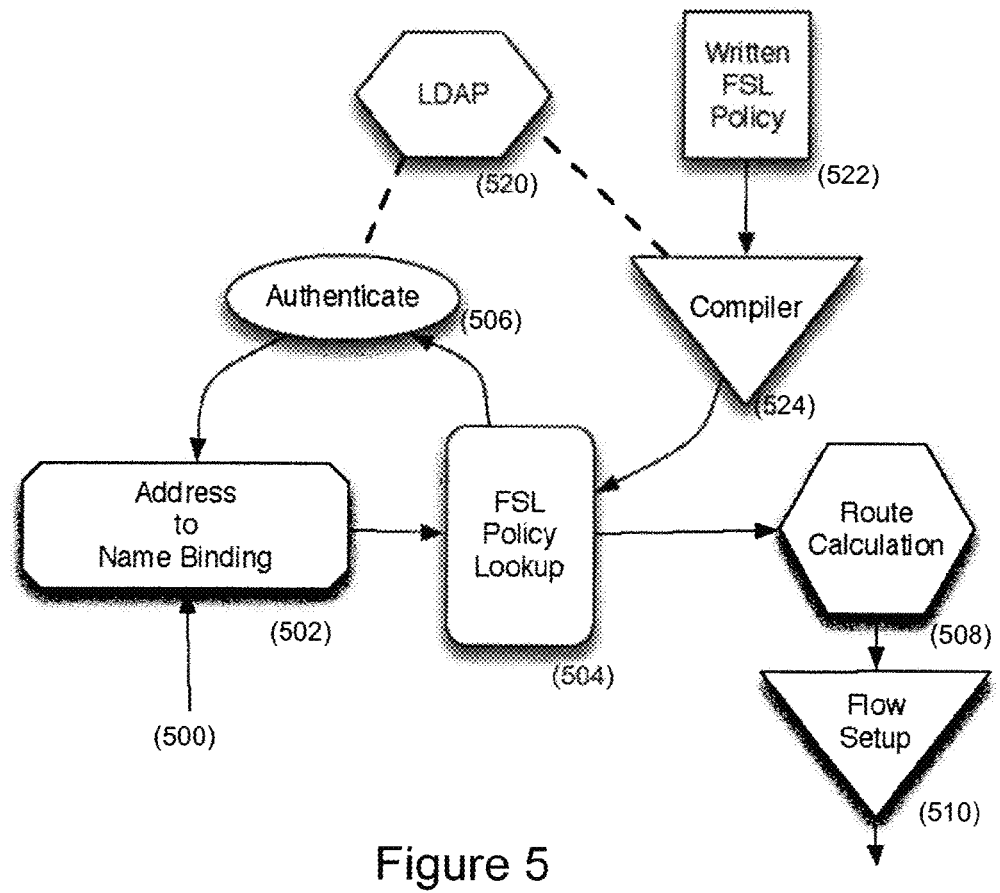
FIG. 5 depicts an example of policy control integrated with NOX according to certain aspects of the invention.

In certain embodiments, NOX comprises a policy engine that handles both admission control policy and access control policy. Admission control policies determine the authentication required for a user, host or switch to join the network. Access control policies determine which flows are allowed to use the network, and the constraints of such use. FIG. 5 depicts an example of policy control integrated with core components of NOX. Typically, policy control relies on other NOX applications to perform topology discovery, routing, authentication, and flow setup. Policy can be declared in one or more files that may be compiled into a low-level lookup tree. The policies can be expressed in special purpose policies languages, such as flow-based security language ("FSL"). The compilation process typically checks all available authentication stores to verify the existence of principal names used in the policy file.

In certain embodiments, packets 500 received by NOX, including packets forwarded to a controller by a switch for which there is no existing switch entry are first tagged with associated names and groups at 502. Binding information between names and addresses can be obtained at principal authentication and the binding information may be stored in the locator component. If binding information does not exist for the packet, the host and user are assumed to be unauthenticated. The policy engine may allow rules to be declared that cover unauthenticated hosts and users.

A policy lookup tree may determine how the network should handle a tagged packet. In certain embodiments, the policy lookup provides a constraint that can be applied to the flow and the constraint may be passed to the routing component to find a policy-compliant path. If no path exists given the policy constraints, the packet is typically dropped. An example of a constraint is the denial of the entire flow, which would result in one or more dropped packets.

The lookup tree also allows the use of custom programmed functions or applets as actions to apply to an incoming packet. Such functions may be created by a programmer or code generator in any desired programming language including, for example, C++ and Python. These custom programmed functions can be used for a variety of purposes: e.g., certain functions can be developed to augment authentication policy. In one example, a rule may state that all unauthenticated hosts from a given access point are required to authenticate via 802.1x before being allowed on the network. Certain embodiments of the invention support a plurality of different authentication schemes, including MAC based host authentication, 802.1x host authentication, and user authentication via redirection to a captive web portal.

The use of policy control as implemented in certain embodiments may best be appreciated through the use of an example. In the example, a unidirectional flow ("uniflow") is characterized by an eight-tuple:

<usrc, hsrc, asrc, utgt, htgt, atgt, prot, request>, in which
usrc, utgt are source and target users, respectively,
hsrc, htgt are the source and target hosts, respectively,
asrc, atgt are the source and target access points, respectively,
prot is the protocol, and
request indicates whether a flow is a response to a previous flow.

Uniflows constitute the input to an access control decision maker. A security policy for NOX associates every possible uniflow with a set of constraints and, for the purposes of this example, a uniflow can be allowed, denied, be required to take a route through the network that includes stipulated hosts (the uniflow is "waypointed"), forbidden to pass through certain stipulated hosts ("waypoints") and rate-limited.

A policy evaluation engine can be built around a decision tree intended to minimize the number of rules that must be checked per flow. The tree may partition the rules based on the eight uniflow fields and the set of groups, resulting in a compact representation of the rule set in a ten-dimensional space, for example. Negative literals can be ignored by the indexer and evaluated at runtime. Each node in the decision tree typically has one child for each possible value for the dimension represented by the node. For example, a node representing usrc can have one child for each value to which usrc is constrained in the subtree's policy rules. In addition, each node can include an "ANY" child for populating rules where the subtree's rules do not constrain the dimension represented by a node. Each node in the decision tree can be implemented using a hash table with chaining to ensure that each of its children can be found in near constant time. The decision as to which of the ten attributes to branch on at any point in the tree may be based on finding the dimension that most widely segments a subtree's rule set. For example, a dimension may be selected to minimize the average number of rules at each child node plus the number of ANY rules in the subtree.

In certain embodiments, group membership can be computed during authentication. G(s) can be used to denote all groups to which the source of a uniflow belongs and G(t) can be used to denote the groups to which the target of a uniflow belongs. To find all rules that pertain to any given uniflow, a normal decision-tree algorithm may be modified such that multiple branches may be followed at any given node. In one example, the ANY branch is always followed and all children that belong to the uniflow's G(s) and G(t), respectively, are followed for branches splitting on source groups and target groups.

FIG. 6 depicts an example of control flow for host authentication within NOX and illustrates how these architectural components work together when authenticating a host. At step 600, a packet is received by NOX from a switch and a packet-in message indicates the switch and switch port on which the packet was received. At step 602, the locator component uses the incoming port, MAC address, and IP address to determine if the host has authenticated. At step 603, if the host has been authenticated, the locator looks up and adds the high-level names and group names for that host. However, if the host has not been authenticated, the locator uses the hostname "unauthenticated" at step 604.

At step 606, the locator component passes the flow and associated names to the policy lookup component. At step 608, the policy lookup that maintains the compiled network policy, specifies how the packet should be handled based on the network addresses and high-level names. Policy specifies which authentication mechanism 609 should be used and packets from the unauthenticated hosts are passed to the indicated subsystem. For example, the packets may be passed for 802.1x authentication or to check for a registered MAC. In certain embodiments, an authentication subsystem is responsible for performing the protocol specific authentication exchange. Once the host has successfully authenticated, the authentication subsystem marks the addresses associated with the host as authenticated. All subsequent packets from this host will be labeled with the name and groups associated with that host. At step 610, the policy specifies the constraints applied to packets from authenticated hosts. If the flow is allowed, the packet is passed to the routing component step 611, which will determine a policy compliant route and set up that route in the network. Otherwise the packet can be dropped at step 612.

When writing and enforcing policy rules, a user typically writes policy as a collection of rules and compiles the policy. The compiler may check syntax and verify that the principal names exist in one of the configured directories. The compiler compiles policy rules into a low-level internal format. Compilation can include canonicalization and rule expansion whereby an "OR" is expanded into multiple rules, for example. The compiler may save compiled policy in persistent storage and builds the entire policy into a lookup tree.

Certain embodiments provide systems and methods for in-band control and controller discovery. In-band control systems transmit control traffic between switches and controllers by sharing the same transmission medium as data traffic. The use of in-band control can simplify physical network setup and configuration by removing the need for a separate control network. Switches and controllers may be configured and/or modified to support certain functions used by in-band control. Typically, switches are provided the ability to find and establish a connection to the controller without help from the controller. Switches must be able to distinguish between control traffic and data traffic in order to avoid communication loops. Additionally, the policy system must be configured to permit in-band communication operations and communications.

In certain embodiments, switches are able to automatically discover a controller without having a priori knowledge of controller-specific state. For example, a switch may automatically detect the controller and establish a secure channel to the controller upon connection to the network. In security-conscious applications, the switch can be connected over a trusted path in order to secure the initial SSL connection.

By default, switches forward discovery packets only when they have established a connection to the controller. On startup, a switch may issue a DHCP request from all ports in order to search for the controller. The switch assumes the controller to be on the port from which it receives a DHCP reply. The DHCP reply will include an IP address for the switch, and the IP address and port numbers on which the controller is listening. The switch can then establish a control connection to the controller out of the port on which the DHCP was received. Typically, switches will not forward control traffic from other switches to the controller. Control traffic is detected by determining that it is being sent to or from a known controller.

In certain embodiments, NOX can control network elements such as switches using standards-based protocols such as OpenFlow. In the OpenFlow abstraction, a switch is represented by a flow-table where each entry contains headers and actions to be performed on matching packets. OpenFlow and other such protocols may be supported and enhanced in systems constructed according to certain aspects of the invention.

Conventional network switches often employ a low-powered CPU for management tasks and special-purpose hardware such as a switch-on-a-chip ("SoC") that performs line-rate switching. Many SoCs have built-in support for ACLs in order to implement firewalls. These ACLs typically support matching at layers 2 through 4 and may also support wild-carding fields. The SoCs are designed to support line-rate processing, since the management CPU is not capable of receiving every packet transiting the switch but the management CPU is generally able to configure the ACLs on remote SoCs. The ACLs on the SoCs typically support a <header: action> interface that is very similar to OpenFlow's interface. For each ACL entry the required match fields and the desired set of actions must be specified. ACL implementations also typically permit definition of a strict ordering in which packets match and the actions associated with the first matching entry are executed against the packet.

Most SoCs support a plurality of actions including dropping packets, sending to the management CPU and forwarding through one or more physical ports. On some platforms, ACLs actions support incrementing counters associated with the entry and modifying packet headers. Often a switch is configured with a lowest priority rule that matches any packet that failed to match a higher priority one. For typical firewalls, the action either causes the packet to be dropped (default deny) or to be passed through (default allow).

The management CPU may consult local software tables configured by NOX. If no matching entry is found, then the packet may be forwarded to a controller. NOX can send commands to add or remove flow entries using a protocol such as OpenFlow. The switch management CPU can be programmed to exploit the capabilities of the ACLs supported by the SoC and can configure the SoC ACL tables based on the flexibility and capabilities of the SoC ACLs. The management CPU may configure the ACL tables as necessary to handle NOX requests, provided sufficient space exists in the flow-table.

Management software is typically configured to be aware of a plurality of factors and issues that may affect network operations. The management processor ensures that flow entries with higher matching priorities are found and processed before flow entries with lower priorities and may reconfigure the arrangement of entries in ACL tables accordingly. If the number of entries requested by NOX exceeds the space available in the ACL table, then the processor may store excess or additional entries in its own software tables. The use of local, processor tables may require careful assignment of storage to ACLs and, in some instances, adjustment of flow entry prioritization functions. Entries that match in the ACL table will not be sent to the management CPU and thus will not find a match in the software table. Therefore, the management software may be configured with rules for placing entries in the processor software table in order to avoid negatively affecting the performance of such flows. Further, where switch hardware comprises two or more SoCs, management software may set ACLs in two locations in the switch to allow packets to travel between the incoming and outgoing chips.

Although conventional ACLs do not typically have a concept of expiring, flow entries inserted by NOX are typically provided with an expiration mechanism. To support this discrepancy in ACLs, software running on the management CPU may be configured to track whether ACL entries continue to match traffic. Such tracking may be accomplished by configuring an action that increments a counter associated with the entry in addition to other forward and drop actions configured by NOX. Software may then poll the ACL counters and check whether any packets have matched the entry since the last poll interval. If no matching packets are observed for a predefined period of idle time for the entry, then the entry may be removed from the ACL table.

Systems constructed according to certain aspects of the invention exhibit certain properties that can include comprehensive control, scaling, backwards compatibility, autoconfiguration and virtual environments.

Figure 7:
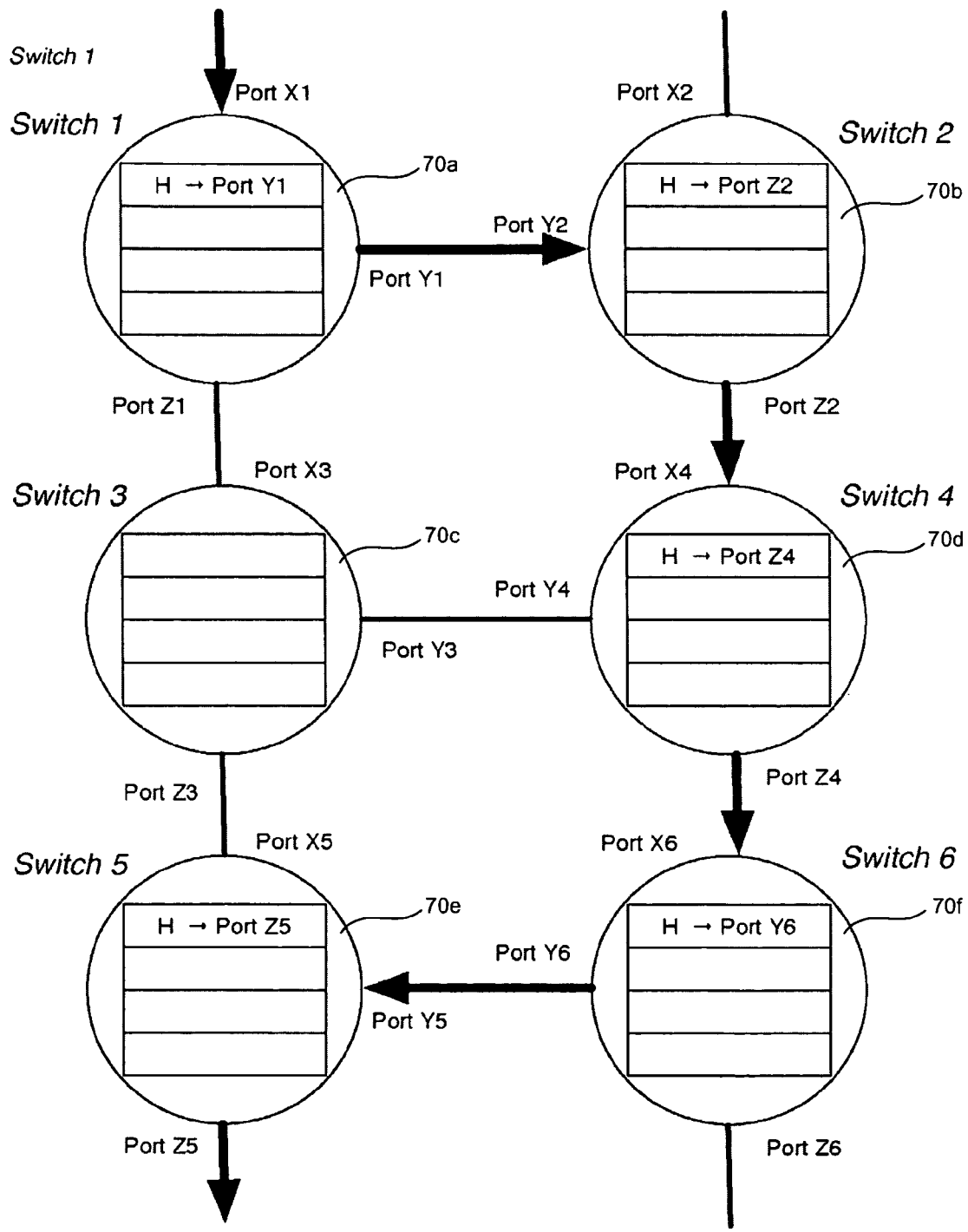
FIG. 7 shows an example of flow entries according to certain aspects of the invention.

With regard to comprehensive control properties, FIG. 7 illustrates flow entries that can dictate the path of a packet through the network and depicts in particular the path of a packet with header H where the path is dictated by a set of flow entries. Certain embodiments comprise systems that have complete control over the method of handling flows in the network. These systems may exercise control through a variety of actions that include denying service to a flow, dropping some or all of packets in a flow, selecting a path through the network by inserting appropriate flow entries in network elements, enabling a chosen quality of service ("QoS") using flow entries, causing network elements to perform various per-packet operations, such as encryption, encapsulation, address translation, rate-limiting and stateful tunneling and by inserting and by inserting services along the path by picking a path that leads to a network element that delivers the desired service, such as an element capable of deep packet inspection or data logging. This latter control option demonstrates that the system is not constrained by the limitations of any abstraction used to control or monitor network devices, because the ability to interpose services permits the system to perform actions currently unsupported in the abstraction.

In certain embodiments, management decisions can be based on a variety of factors, that include: source and/or destination user identity, role, location, group membership, and other attributes; source and/or destination host identity, role, location, group membership, and other attributes; local and/or global network conditions, including various network events and/or notifications by other management applications; and date and time. Management decisions can be modified in the middle of a flow. For example, if network conditions change or some other network event is detected, flows can be rerouted and/or subjected to additional scrutiny by a deep-packet-inspection service.

In certain embodiments, NOX can be scaled to extremely large system sizes. In these embodiments, certain consistency requirements in the design may need to be tightly controlled. Typically, only the network view need be used consistently across controllers because applications often use only data from the network view, along with the specified policy, to make control decisions. Consistency in control decisions related to a flow will be reached regardless of which controller receives the flow because no information about the state of individual packets or flows are typically used in making these control decisions.

In certain embodiments, the network view changes very slowly compared to the rate at which new flows arrive. This allows the network view to provide a globally consistent view of a large set of controllers, which allows the system to make use of many controllers in parallel, each taking care of a subset of flows in the network, thereby allowing the system to be scaled. The limiting factor to system scaling is the rate of change of the network view. In terms of raw computational requirements, a single server could easily handle the rate of change for most current enterprise networks.

More generally, NOX can use parallelism for events that occur on rapid timescales, such events including packet arrivals and flow arrivals. Packet arrivals are typically handled by individual switches without global per-packet coordination and flow-initiations can be handled by a controller without global per-flow coordination. Flows can be sent to any controller, so the capacity of the system can be increased by adding more servers running controller processes. The network view global data structure typically changes slowly enough that it can be maintained centrally for very large networks. For resilience, however, the network view may be maintained on a small set of replicas.

Certain embodiments of the invention comprise components and elements that are backwards compatible with conventional systems. Systems constructed according to aspects of the invention do not require any special actions on the part of network-attached devices. For example, Ethernet connected devices can function as if they were attached to a normal Ethernet network and consequently do not require any modification. Systems constructed according to aspects of the invention can coexist with network elements that do not support OpenFlow or other standards-based interfaces with similar functionality as described herein. These non-OpenFlow network elements will forward packets as normal and the system can merely incorporate them into the overall network fabric. However the system may not be able to exert control over how these unmodified network elements behave, but may characterize such components according to the networking standards to which they conform (e.g., standard Ethernet, etc.).

Certain embodiments support autoconfiguration of the network and its constituents. Configuration may be facilitated using system directories that may capture necessary information about network entities such as roles, attributes and group membership. The management objectives may be captured through a set of policies articulated in one or more management applications or system files. A new network entity entering the system can be automatically detected and appropriate policies can be applied to communications with the new entity. Similarly, a new network element entering the system can be automatically detected and flow entries or other management commands can be sent to the new element in accordance with system policies. Consequently, there is typically no need for explicit configuration of individual network elements except when equipping the elements with cryptographic keys necessary to communicate securely with controllers.

Certain embodiments support virtual environments having virtual machines ("VMs") and virtual switches. VMs are a form of a network entity, and virtual switches are a form of network element. If each server or network element supports an abstraction such as OpenFlow on its Virtual Switches, then the system correctly enforces policy. This remains true as VMs move or are co-located on the same server and requires no special functionality on the server besides the OpenFlow implementation.

Certain embodiments maintain histories of network state that may be used for troubleshooting and forensics. The system keeps a historical record of the network view, in addition to the complete list of flows and their statistics such as packets and bytes in addition to timing of arrivals and departures. This allows an operator to see the state of the network view at any point in time. For example, the operator may see the complete view of the network two years or two hours prior to the current time. From the historical view, an operator may determine which user and host sent a packet. The history of all communications enables operators to perform flow level analysis of network traffic, which can be used to determine network events that transpired over a defined period of time. Thus a history may reveal Email transmissions, host reboots and events preceding and/or following a target event. The historical view typically contains a history of the bindings between high-level names and low-level addresses which permits more definitive attribution of past events to individual users. Thus, it can be determined who transferred a file and who logged into a selected host at a certain time. This information can be used for network troubleshooting and to detect various forms of anomalous or suspicious behavior in the past network traffic. NOX can provide additional information in support of such troubleshooting and forensic analyses.

Certain embodiments provide enhanced routing functionality and provide systems that have complete control over routing of paths flows take through the network. A controller can set up a set of flow entries that will cause packets from a flow to take an arbitrary path through the network. In particular, paths need not be chosen from a single "spanning tree" and different flows going between the same source and destination can take different paths. Moreover, management applications can, at any time, reroute flows by merely inserting a new set of flow entries. This allows management applications to choose routes that accomplish load balancing, use short-cut paths and support fast failover, and so on. Load balancing may be employed when one or more links in the network is overly utilized. An application can choose a new path for flows traversing that overloaded link, or can choose paths that avoid that link for newly arriving flows. In particular, routing can take advantage of multiple paths to spread out the network load.

Short-cut paths provide routes that need not follow a hierarchical pattern, where all flows must travel through a major aggregation switch. Instead, paths can choose "short-cuts" which are paths that avoid the central hierarchy. Fast failover is used to reroute only those paths that traversed a failed link upon detection of the failure. This permits most flows to function during a failure. Where necessary, rerouting of flows can be accomplished as soon as the controller is notified of the failed link.

Certain embodiments support improved packet interceptions and associated features such as host sleep. Conventional computers may support an ability to sleep or otherwise save power when not in active use. However, the arrival of packets at their network interface card ("NIC") can interfere with power reduction features because these packets need to be processed by the CPU. Often during low-duty times, almost all of the traffic is network chatter that does not convey useful information to the destination host and does not require non-trivial action to be taken by the host. In accordance with aspects of the present invention, a controller can decide to not forward these packets, and may process the packets on behalf of the intended host. For example, a network controller, or a network element acting on its behalf, can respond to certain network requests that seek to discover whether the destination host remains in contact with the network. This will allow the host to remain in its reduced power mode. However, the controller can recognize and forward important traffic, such as secure shell ("SSH") traffic, alerts, queries and other requests, in order to allow the host to respond appropriately. By having the controller inspect packets before forwarding them and possibly establishing flow entries, the network manager can make intelligent decisions about which packets to forward.

Certain embodiments can protect controllers and the network view from denial of service ("DoS") attacks. To prevent a flooding denial-of-service attack on the controllers and the network view, the system can limit the rate at which individual network elements and entities can send packets towards controllers and other elements of the system. This can protect crucial network and system resources. This protection is possible because controllers can detect resource overloads and modify appropriate flow entries to limit or prevent access to the overloaded resource.

The foregoing descriptions of the invention are intended to be illustrative and not limiting. For example, those skilled in the art will appreciate that the invention can be practiced with various combinations of the functionalities and capabilities described above, and can include fewer or additional components than described above. Certain additional aspects and features of the invention are further set forth below, and can be obtained using the functionalities and components described in more detail above, as will be appreciated by those skilled in the art after being taught by the present disclosure.

Attached as Appendix A is source code that implements an embodiment of NOX as described in more detail above.

Certain embodiments of the invention provide systems and methods for controlling global routing and other forwarding behaviors (including network address translation, encryption, encapsulation, stateful tunneling, and various forms of quality-of-service.) These decisions can be made individually for each flow, in real-time as the flow begins, and can be based on general policies that are expressed in terms of high-level names (for hosts, users, services, etc.). The implementation of these policies can be independent of the network topology, and the implementation remains valid as users and hosts move, and the network changes. Certain embodiments of the invention can be implemented using the ACL functionality provided for in most commercial switching chips.

Certain embodiments of the invention provide systems and methods for maintaining a comprehensive network view. In some of these embodiments, the network view comprises a topology of network elements. In some of these embodiments, the network view identifies location of entities, the entities including users, services and hosts. In some of these embodiments, a history of the network view, along with a history of network flows, is maintained.

Certain embodiments of the invention provide a centralized programmatic interface that gives high-level languages access to a network view, notification of network events including flow initiations and changes in the network view and control mechanisms for controlling network elements. In some of these embodiments, the system provides real-time per-flow control of global routes. In some of these embodiments, the system controls the path of the flow through the network, and the handling of the flow by network elements. In some of these embodiments, the system is scalable through strict separation of consistency requirements, with only the network view requiring global consistency. In some of these embodiments, decisions regarding a flow are based on the global network view and the flow state. In some of these embodiments, this allows separating a consistent but slowly changing network view from local but rapidly changing parameters. In some of these embodiments, flow state is processed independently by each of a plurality of controllers.

Certain embodiments of the invention provide methods for autoconfiguring a network. In some of these embodiments, autoconfiguring includes automatically detecting new devices and services connected to the network. In some of these embodiments, autoconfiguring includes automatically updating flow entries and other configuration information. In some of these embodiments, this automatic updating of flow entries and other configuration information allows the implementation of global directives ("policies") to be maintained in the face of various network changes.

Certain embodiments of the invention provide support for intelligent interception of packets, enabling hosts to remain in a reduced power mode.

Certain embodiments of the invention provide support for virtual environments including support for migrating VMs. In some of these embodiments, wherein multiple VMs are associated with certain devices, the system allows for control of communications between these co-resident VMs. In some of these embodiments, in-band control is used to manage devices. In some of these embodiments, switches are controlled using ACL functionality to provide global functionality.

Certain embodiments of the invention provide support for managing and securing multiple networks through a single system.

Certain embodiments of the invention provide support for having multiple management systems share control of a single network infrastructure, enabling different administrative authorities to split control.

Certain embodiments of the invention provide systems and methods for managing a network. Some of these embodiments comprise maintaining a network view of current state of the network, the current state of the network characterizing network constituents and a network topology, the network constituents including network entities and network elements currently addressable on the network, announcing events corresponding to changes in the state of the network and configuring one of the network elements based on the network view and one of the events. In some of these embodiments, the network entities include network users. In some of these embodiments, the network view is accessed by one or more network management applications. In some of these embodiments, the current state of the network includes location of the network constituents. In some of these embodiments, the current state of the network further characterizes data flows in the network.

In some of these embodiments, configuring one of the network elements includes changing the network topology. In some of these embodiments, changing the network topology includes providing routing information to a plurality of the network elements, the routing information corresponding to one or more of the data flows. Some of these embodiments further comprise storing a history of prior network views. In some of these embodiments, each prior network view in the history records a network state at a specified time and further records events detected prior to the specified time. In some of these embodiments, the specified time is defined by a schedule and each occurrence of an event is recorded in only one prior network view in the history. In some of these embodiments, the specified time corresponds to the occurrence of an event. In some of these embodiments, each of the data flows is associated with forwarding behaviors of one or more of the network elements and further comprising controlling certain of the forwarding behaviors based on the network view.

In some of these embodiments, controlling the certain of the forwarding behaviors includes modifying at least one of the forwarding behaviors responsive to one of the events. In some of these embodiments, controlling the certain of the forwarding behaviors includes modifying at least one of the forwarding behaviors subsequent to changing the network topology. In some of these embodiments, the step of modifying at least one of the forwarding behaviors is performed by a network controller. In some of these embodiments, changing the network topology includes autoconfiguring devices newly inserted into the network. In some of these embodiments, autoconfiguring devices includes providing at least one ACL to each autoconfigured device. In some of these embodiments, each of the data flows is associated with forwarding behaviors of one or more network elements and wherein autoconfiguring devices includes modifying at least one of the forwarding behaviors based on the network view. In some of these embodiments, configuring one of the network elements is performed by a network management system. In some of these embodiments, certain of the events are generated by the network management system based on a comparison of the current state of the network and a history of network state maintained by the network management system.

In some of these embodiments, the network management systems comprise a network view describing current state of the network. In some of these embodiments, the state of the network includes a current network topology, locations of a plurality of network elements on the network, locations of network constituents, the network constituents including at least one user of the network and a network manager. In some of these embodiments, the network manager configures network elements based on the network state. In some of these embodiments, the network view is generated from information provided by network constituents and wherein portions of the network view are accessible by certain of the network constituents.

In some of these embodiments, the network elements include switches. In some of these embodiments, the network elements include routers. In some of these embodiments, the network manager is dispersed across a plurality of network elements. In some of these embodiments, the network entities include services provided through the network. In some of these embodiments, the network entities include applications. Some of these embodiments further comprise a network operating system providing the applications access to selected functions of the network manager. In some of these embodiments, the selected functions include the network view. In some of these embodiments, the selected functions include an event notification function. In some of these embodiments, the event notification function provides notification of changes to the network topology. In some of these embodiments, the event notification function provides notification of user log events, including login and logout events.

In some of these embodiments, the event notification function provides notification of a flow initiation. In some of these embodiments, the network manager reconfigures a switch based on changes in the network state. In some of these embodiments, the switch is reconfigured to establish a new forwarding behavior associated with a data flow. In some of these embodiments, the switch is reconfigured using an access control list. In some of these embodiments, the switch is reconfigured using OpenFlow. In some of these embodiments, the switch is reconfigured using OpenFlow. In some of these embodiments, the network manager detects and automatically provides configuration information to newly added network elements. In some of these embodiments, the configuration information includes one or more network addresses. In some of these embodiments, the configuration information includes one or more routing tables. In some of these embodiments, the configuration information includes one or more access control lists. In some of these embodiments, the configuration information includes a portion of the network view.

Some of these embodiments further comprise a history of prior network state, the history recording changes in network state and events causing changes in the network state. In some of these embodiments, the state of the network further includes one or more of packet classifications, language bindings, location of network entities, routing information of data flows and topology. In some of these embodiments, the state of the network further includes information corresponding to state of the data flows. In some of these embodiments, the network constituents comprise network elements and the information corresponding to the state of each data flow is maintained by a network element associated with the each data flow.

Certain embodiments of the invention provide a network operating system. Some of these embodiments comprise a network view describing current state of the network, wherein the state of the network includes a current network topology, locations of a plurality of network elements on the network, locations of network constituents, the network constituents including at least one user of the network, a programmatic interface providing access to the network view to an application installed on a network constituent and a set of network services accessible to the application and providing access to information related to the current network state. In some of these embodiments, the information includes one or more of packet classifications, language bindings, location of network entities, routing information of data flows and topology.

Certain embodiments of the invention provide systems and methods for managing network connections. Some of these embodiments comprise identifying a flow in a network, the flow identifying a source and a destination of data, configuring one or more network elements to direct the data from the source to the destination, wherein configuring the at least one network elements includes modifying an access control list ("ACL") in one or more network element. In some of these embodiments, configuring the at least one network elements further includes generating an ACL for one of the at least one network elements. In some of these embodiments, at least one network element includes a switch. In some of these embodiments, the switch includes a switch-on-chip ("SoC"), and wherein the step of modifying an ACL includes adding the generated ACL to an ACL table in the SoC. In some of these embodiments, the ACL table resides in the SoC. In some of these embodiments, the ACL table resides in the storage associated with a processor in the switch. In some of these embodiments, configuring the at least one network elements further includes providing an expiration period to the generated ACL. In some of these embodiments, configuring the at least one network elements further includes providing an expiration period to the ACL.

In some of these embodiments, modifying an access control list includes reconfiguring an arrangement of entries in an ACL table in the one or more network element. In some of these embodiments, identifying a flow includes maintaining a network view of a current state of the network, the current state of the network characterizing network constituents and a network topology, the network constituents including network entities and network elements currently addressable on the network.

Certain embodiments of the invention provide systems and methods for intercepting network traffic. Some of these embodiments comprise determining a sleep state of a host connected to a network, configuring a network element to inspect data communications directed to the host, forward a portion of the data communications to the host upon detection of information in the data communications requiring action by the host, and selectively respond to requests on behalf of the host if the data communications does not require action by the host. In some of these embodiments, the information requiring action by the host includes one or more requests. In some of these embodiments, the information requiring action by the host includes one or more queries. In some of these embodiments, the information requiring action by the host includes one or more alerts. In some of these embodiments, the information requiring action by the host includes SSH traffic.

Although the present invention has been described with reference to specific exemplary embodiments, it will be evident to one of ordinary skill in the art that various modifications and changes may be made to these embodiments without departing from the broader spirit and scope of the invention. Accordingly, the specification and drawings are to be regarded in an illustrative rather than a restrictive sense.

What is claimed is:

1. For a network operating system that executes on a network controller computing device and manages a network comprising a plurality of network elements that forward data flows in the network, a method comprising:

configuring forwarding behaviors of the plurality of network elements according to network policies declared by a set of management applications that operate on top of the network operating system, wherein the forwarding behavior of each of the plurality of network elements is specified by a set of flow entries stored on the respective network element;

receiving a packet from a particular network element of the plurality of network elements for a particular data flow when the particular network element is unable to match the packet to a flow entry of the set of flow entries stored on the particular network element;

analyzing the packet according to the declared network policies and a current view of the network comprising a current topology of the plurality of network elements to determine whether to modify a forwarding behavior of the particular network element; and when the forwarding behavior of the particular network element is to be modified, configuring the particular network element to forward additional packets for the particular data flow.

2. The method of claim 1 further comprising managing creation and distribution of system events to the set of management applications.

3. The method of claim 1, wherein the plurality of network elements comprises a set of virtual switches.

4. The method of claim 1, wherein the plurality of network elements forward data to and from virtual machines.

5. The method of claim 1, wherein receiving the packet from the particular network element comprises receiving the packet with a message that indicates the particular network element and a particular port of the particular network element.

6. The method of claim 1, wherein analyzing the packet comprises determining how to handle the packet based on network addresses and high-level names associated with the packet.

7. A non-transitory machine readable medium for storing a network operating system which when executed by a set of processors manages a network comprising a plurality of network elements that forward data flows in the network, the network operating system comprising sets of instructions for:

configuring forwarding behaviors of the plurality of network elements according to network policies declared by a set of management applications, wherein the forwarding behavior of each of the plurality of network elements is specified by a set of flow entries stored on the respective network element;

receiving a packet from a particular network element of the plurality of network elements for a particular data flow when the particular network element is unable to match the packet to a flow entry of the set of flow entries stored on the particular network element; and analyzing the packet according to the declared network policies and a current view of the network comprising a current topology of the plurality of network elements to determine whether to modify a forwarding behavior of the particular network element; and when the forwarding behavior of the particular network element is to be modified, configuring the particular network element to forward additional packets for the particular data flow.

8. The non-transitory machine readable medium of claim 7, wherein the network operating system further comprises a set of instructions for managing creation and distribution of system events to the set of management applications.

9. The non-transitory machine readable medium of claim 7, wherein the plurality of network elements comprises a set of virtual switches.

10. The non-transitory machine readable medium of claim 7, wherein the plurality of network elements forward data to and from virtual machines.

11. The non-transitory machine readable medium of claim 7, wherein the set of instructions for receiving the packet from the particular network element comprises a set of instructions for receiving the packet with a message that indicates the particular network element and a particular port of the particular network element.

12. The non-transitory machine readable medium of claim 7, wherein the set of instructions for analyzing the packet comprises a set of instructions for determining how to handle the packet based on network addresses and high-level names associated with the packet.

13. A network controller for managing a network comprising a plurality of network elements that forward data flows in the network, the network controller comprising:

a set of processors; and a non-transitory machine readable medium for storing a network operating system comprising sets of instructions for:

configuring forwarding behaviors of the plurality of network elements according to network policies declared by a set of management applications, wherein the forwarding behavior of each of the plurality of network elements is specified by a set of flow entries stored on the respective network element;

receiving a packet from a particular network element of the plurality of network elements for a particular data flow when the particular network element is unable to match the packet to a flow entry of the set of flow entries stored on the particular network element;

analyzing the packet according to the declared network policies and a current view of the network comprising a current topology of the plurality of network elements to determine whether to modify forwarding behaviors of the particular network element; and when the forwarding behaviors of the particular network element are to be modified, configuring the particular network element to forward additional packets for the particular data flow.

14. The network controller of claim 13, wherein the network operating system further comprises a set of instructions for managing creation and distribution of system events to the set of management applications.

15. The network controller of claim 13, wherein the plurality of network elements comprises a set of virtual switches.

16. The network controller of claim 13, wherein the plurality of network elements forward data to and from virtual machines.

17. The network controller of claim 13, wherein the set of instructions for receiving the packet from the particular network element comprises a set of instructions for receiving the packet with a message that indicates the particular network element and a particular port of the particular network element.

18. The network controller of claim 13, wherein the set of instructions for analyzing the packet comprises a set of instructions for determining how to handle the packet based on network addresses and high-level names associated with the packet.

19. A network control system comprising:

a plurality of network elements that forward data flows in a network, wherein forwarding behaviors of each of the plurality of network elements are specified by a set of flow entries stored on the respective network element; and a network controller comprising a set of processing units, the network controller for configuring the forwarding behaviors of the plurality of network elements according to network policies declared by a set of management applications, wherein each network element of the plurality of network elements is for sending a packet for a particular data flow to the network controller when the respective network element is unable to match the packet to a flow entry of the set of flow entries stored on the respective network element, and wherein the network controller is further for analyzing the received packet according to the declared network policies and a current view of the network comprising a current topology of the plurality of network elements to determine whether to modify forwarding behaviors of the respective network element, when the forwarding behaviors of the respective network element are to be modified, configuring the respective network element to forward additional packets for the particular data flow.

20. The network control system of claim 19, wherein the network controller is further for managing creation and distribution of system events to the set of management applications.

21. The network control system of claim 19, wherein the plurality of network elements comprises a set of virtual switches.

22. The network control system of claim 19, wherein the plurality of network elements forward data to and from virtual machines.

23. The network control system of claim 19, wherein each network element of the plurality of network elements sends the packet for the particular data flow with a message that indicates the respective network element and a particular port of the respective network element.

24. The network control system of claim 19, wherein the network controller analyzes the packet by determining how to handle the packet based on network addresses and high-level names associated with the packet.

* * * * *